(12) United States Patent
Zhang et al.

(10) Patent No.: US 9,363,788 B2
(45) Date of Patent: Jun. 7, 2016

(54) EFFICIENT VARIABLE RATE FOR BROADCAST/MULTICAST SERVICE

(71) Applicant: QUALCOMM Incorporated, San Diego, CA (US)

(72) Inventors: Xiaoxia Zhang, San Diego, CA (US); Jun Wang, San Diego, CA (US); Nikolai Konrad Leung, Takoma Park, MD (US); Gordon Kent Walker, Poway, CA (US); Daphna Zeilingold, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

(21) Appl. No.: 13/672,511

(22) Filed: Nov. 8, 2012

(65) Prior Publication Data

US 2013/0114497 A1 May 9, 2013

Related U.S. Application Data

(60) Provisional application No. 61/557,887, filed on Nov. 9, 2011.

(51) Int. Cl.
*H04W 72/00* (2009.01)
*H04L 12/18* (2006.01)
(Continued)

(52) U.S. Cl.
CPC ............. *H04W 72/005* (2013.01); *H04W 4/06* (2013.01); *H04W 72/04* (2013.01); *H04W 28/16* (2013.01)

(58) Field of Classification Search
CPC ... H04W 72/005; H04L 12/189; H04L 45/00; H04L 47/10; H04L 2012/5672; H04Q 11/0478

USPC .......................................... 370/312, 389, 391
See application file for complete search history.

(56) References Cited

U.S. PATENT DOCUMENTS

| 2003/0174678 A1* | 9/2003 | Chang ................. H04W 76/002 370/335 |
| 2009/0161683 A1* | 6/2009 | Allie et al. .................... 370/401 |

(Continued)

FOREIGN PATENT DOCUMENTS

| EP | 1978762 A1 | 10/2008 |
| EP | 2426958 A1 | 3/2012 |

(Continued)

OTHER PUBLICATIONS

International Search Report and Written Opinion—PCT/US2012/064503—ISA/EPO—May 22, 2014.

(Continued)

*Primary Examiner* — Ronald B Abelson
(74) *Attorney, Agent, or Firm* — Arent Fox LLP

(57) ABSTRACT

A method, an apparatus, and a computer program product for wireless communication are provided in which at least one bit rate for allocating network resources from a broadcast-multicast service center (BM-SC) is received. The network resources are then allocated based on the at least one bit rate. Moreover, all evolved Node Bs (eNBs) in a broadcast/multicast area are informed of the network resource allocation. Additionally, the network resources are allocated for a session based on a first bit rate, wherein the first bit rate is greater than a guaranteed bit rate (GBR), and the network resource allocation is adjusted to a second bit rate based on the occurrence of an event, wherein the second bit rate is equal to GBR.

111 Claims, 23 Drawing Sheets

(51) Int. Cl.
*H04L 12/701* (2013.01)
*H04L 12/801* (2013.01)
*H04L 12/70* (2013.01)
*H04W 4/06* (2009.01)
*H04W 72/04* (2009.01)
*H04W 28/16* (2009.01)

(56) References Cited

U.S. PATENT DOCUMENTS

| | | |
|---|---|---|
| 2010/0195558 A1 | 8/2010 | Koskinen |
| 2011/0044225 A1 | 2/2011 | Rinne et al. |
| 2011/0128903 A1 | 6/2011 | Futaki et al. |
| 2012/0008525 A1* | 1/2012 | Koskinen ............... 370/253 |
| 2012/0014248 A1 | 1/2012 | Drevo |
| 2012/0026880 A1 | 2/2012 | Miller et al. |
| 2012/0033623 A1 | 2/2012 | Chu et al. |
| 2012/0051281 A1 | 3/2012 | Chen et al. |
| 2012/0140619 A1 | 6/2012 | Chen |
| 2012/0250503 A1 | 10/2012 | Willig et al. |

FOREIGN PATENT DOCUMENTS

| | | | | |
|---|---|---|---|---|
| WO | 2010001928 A1 | 1/2010 | | |
| WO | 2010124421 A1 | 11/2010 | | |
| WO | WO 2011/026499 | * | 3/2011 | .............. H04W 4/06 |

OTHER PUBLICATIONS

Nokia et al., "MBSFN Scheduling and Content Synchronization", 3GPP Draft; R2-072412 MBSFN Scheduling and Content Synchronization, 3rd Generation Partnership Project (3GPP), Mobile Competence Centre; 650, Route Des Lucioles; F-06921 Sophia-Antipolis Cedex; France, vol. RAN WG2, No. Orlando, USA; 20070622, Jun. 22, 2007, XP050135250, pp. 1-12, [retrieved on Jun. 22, 2007] the whole document.

Translation of Decision of Rejection for Japanese Application No. 2014-541338 dated Sep. 1, 2015, 2 pages.

Partial International Search Report—PCT/US2012/064503—ISA/EPO—May 10, 2013.

* cited by examiner

EFFICIENT VARIABLE RATE FOR BROADCAST/MULTICAST SERVICE

CROSS-REFERENCE TO RELATED APPLICATION(S)

This application claims the benefit of U.S. Provisional Application Ser. No. 61/557,887, entitled "EFFICIENT VARIABLE RATE FOR BROADCAST/MULTICAST SERVICE" and filed on Nov. 9, 2011, which is expressly incorporated by reference herein in its entirety.

BACKGROUND

1. Field

The present disclosure relates generally to communication systems, and more particularly, to providing an efficient variable bit rate for a broadcast/multicast service.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Current eMBMS specifications typically require a constant bit rate to be requested from a broadcast-multicast service center (BM-SC) for MBMS over E-UTRAN. Thus, a maximum bit rate (MBR) is equal to a guaranteed bit rate (GBR). This results in fixed bandwidth allocation, wherein each MBMS service utilizes a constant bandwidth and streams have a constant bit rate (CBR). However, certain signals, such as video signals, by nature, have a variable bit rate. When a network has more resources available, it is desirable to allocate more resources to the video signals to provide a higher quality signal. Current eMBMS specifications also require that quality of service (QoS) parameters in an MBMS Session Update Request message be identical to the QoS parameters in a preceding Session Start message. The previously requested constant bit rate (i.e., GBR=MBR) for each MBMS session typically does not change. However, given the heterogeneous nature of video signals, it is desirable to vary the bit rate since parts of the video that are difficult to encode may require a higher bit rate, and parts of the video that are easier to encode may require a lower bit rate. Also, different content sources typically do not need the same bandwidth at the same time. Thus, current QoS design in eMBMS may be problematic because no efficient variable bit rate can be requested from the content source/encoder, MBMS quality may be not optimal, and network resource usage may be not efficient.

Accordingly, the present disclosure provides for requesting variable bandwidth from the BM-SC for dynamic allocation of bandwidth for each MBMS service from a multi-cell/multicast coordination entity (MCE).

In an aspect of the disclosure, a method, an apparatus, and a computer program product for wireless communication are provided. The apparatus receives at least one bit rate for allocating network resources from a broadcast-multicast service center (BM-SC), allocates the network resources based on the at least one bit rate, and informs all evolved Node Bs (eNBs) in a broadcast/multicast area of the network resource allocation.

Another aspect relates to the apparatus receiving from at least one eNB in the broadcast/multicast area status information indicating a change in an amount of data being received by the at least one eNB via the allocated network resources, and adjusting the network resource allocation based on the received status information.

A further aspect relates to the at least one bit rate comprising a guaranteed bit rate (GBR), wherein the apparatus allocates the network resources for a session based on a first bit rate, the first bit rate greater than GBR, and adjusts the network resource allocation to a second bit rate based on the occurrence of an event, the second bit rate equal to GBR.

Still another aspect relates to the at least one bit rate comprising a maximum bit rate (MBR) and a guaranteed bit rate (GBR), wherein the apparatus determines an amount of available network resources for adjusting a network resource allocation of a session, determines an adjusted bit rate for transmitting data based on the adjusted network resource allocation, and informs the BM-SC and all eNBs of the adjusted bit rate.

An aspect relates to the apparatus receiving a network resource allocation from a multi-cell/multicast coordination entity (MCE), the network resource allocation based on at least one bit rate received from a broadcast-multicast service center (BM-SC), and scheduling to receive broadcast/multicast data based on the network resource allocation if the broadcast/multicast data exists to be received.

Another aspect relates to the apparatus determining a change in an amount of data being received via the network resource allocation, transmitting to the MCE status information indicating the change in the amount of data being received, and receiving from the MCE an adjusted network resource allocation based on the transmitted status information.

A further aspect relates to the at least one bit rate comprising a guaranteed bit rate (GBR), wherein the apparatus schedules to receive broadcast/multicast data based on the network resource allocation at a first bit rate, the first bit rate greater than GBR, and receives from the MCE an adjusted network resource allocation to a second bit rate based on the occurrence of an event, the second bit rate equal to GBR.

Still another aspect relates to the apparatus transmitting at least one bit rate for allocating network resources of a session to a multi-cell/multicast coordination entity (MCE), receiving an adjusted bit rate from the MCE, the adjusted bit rate for transmitting data based on an adjusted network resource allocation determined by the MCE, and transmitting data based on the adjusted bit rate.

DETAILED DESCRIPTION

Figure 1:
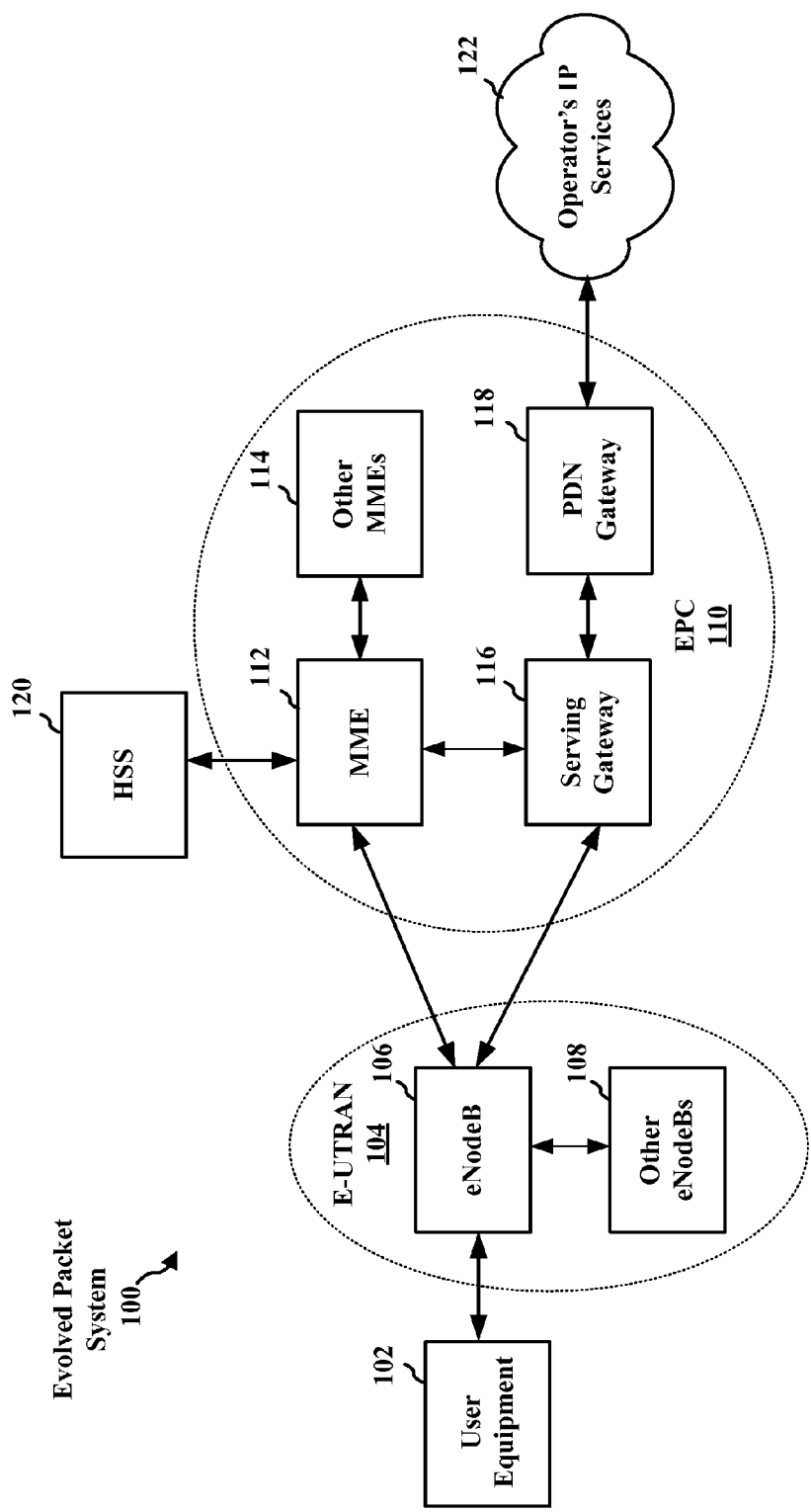
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
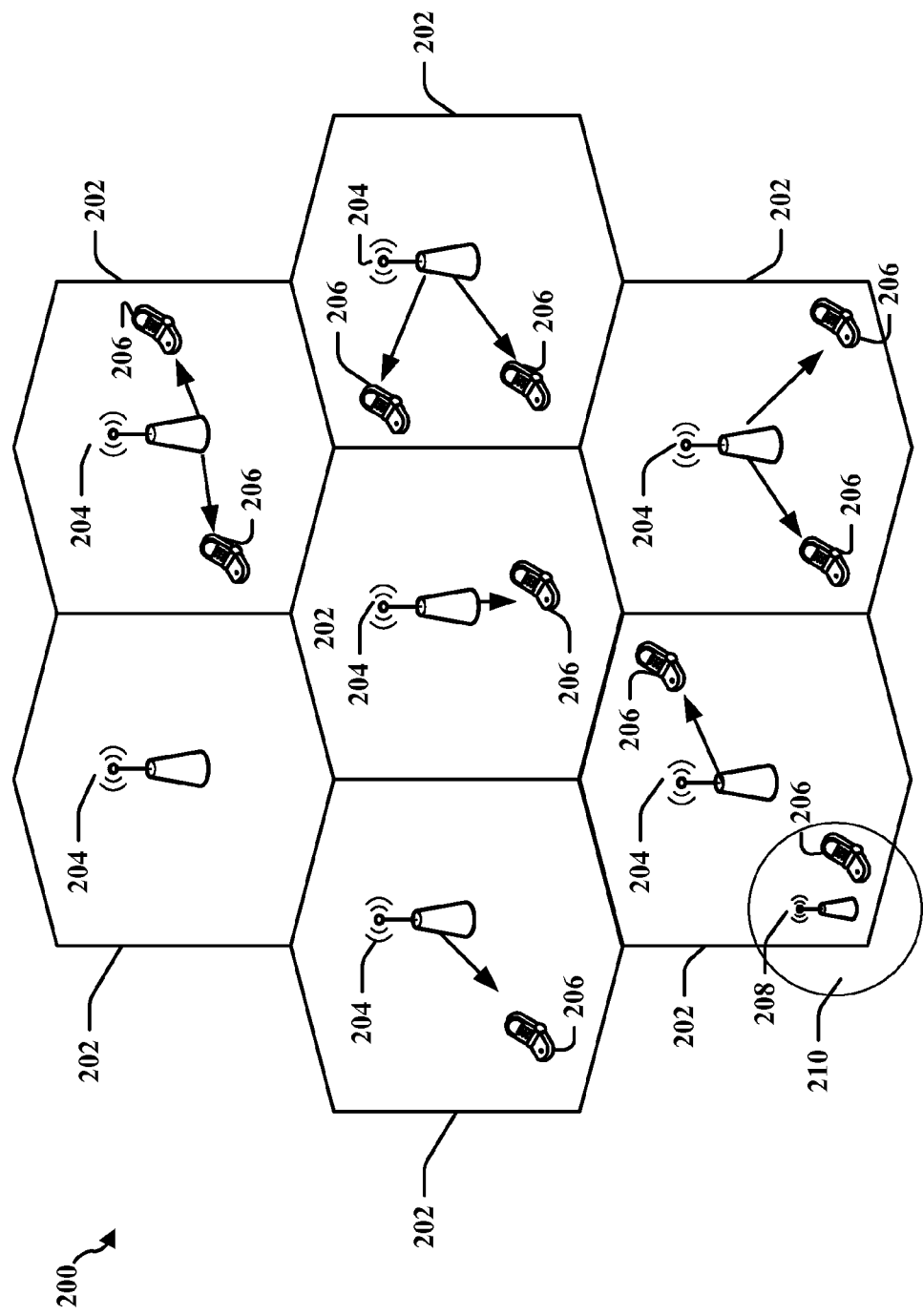
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
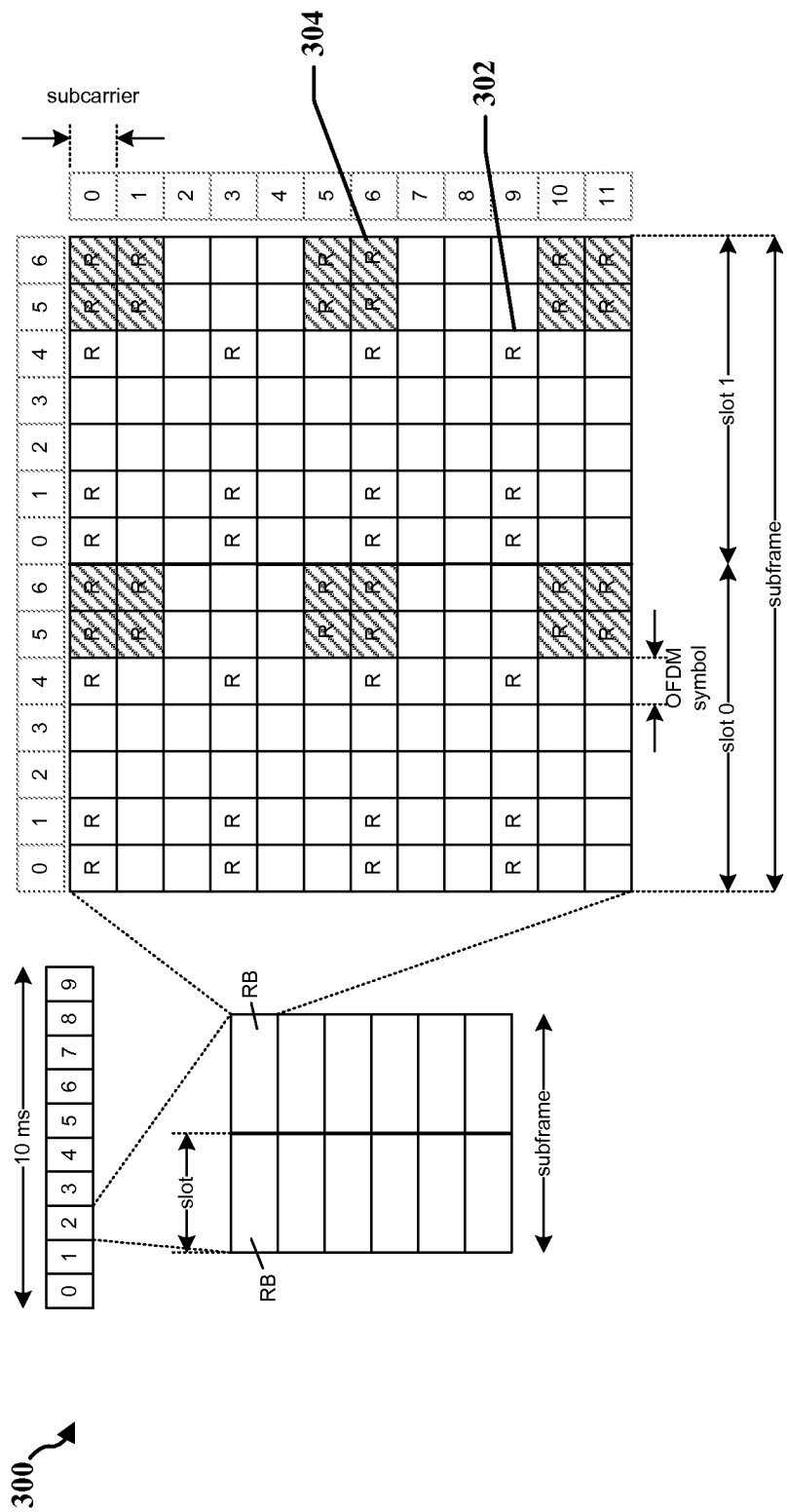
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block may contain 6 consecutive OFDM symbols in the time domain and may have 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
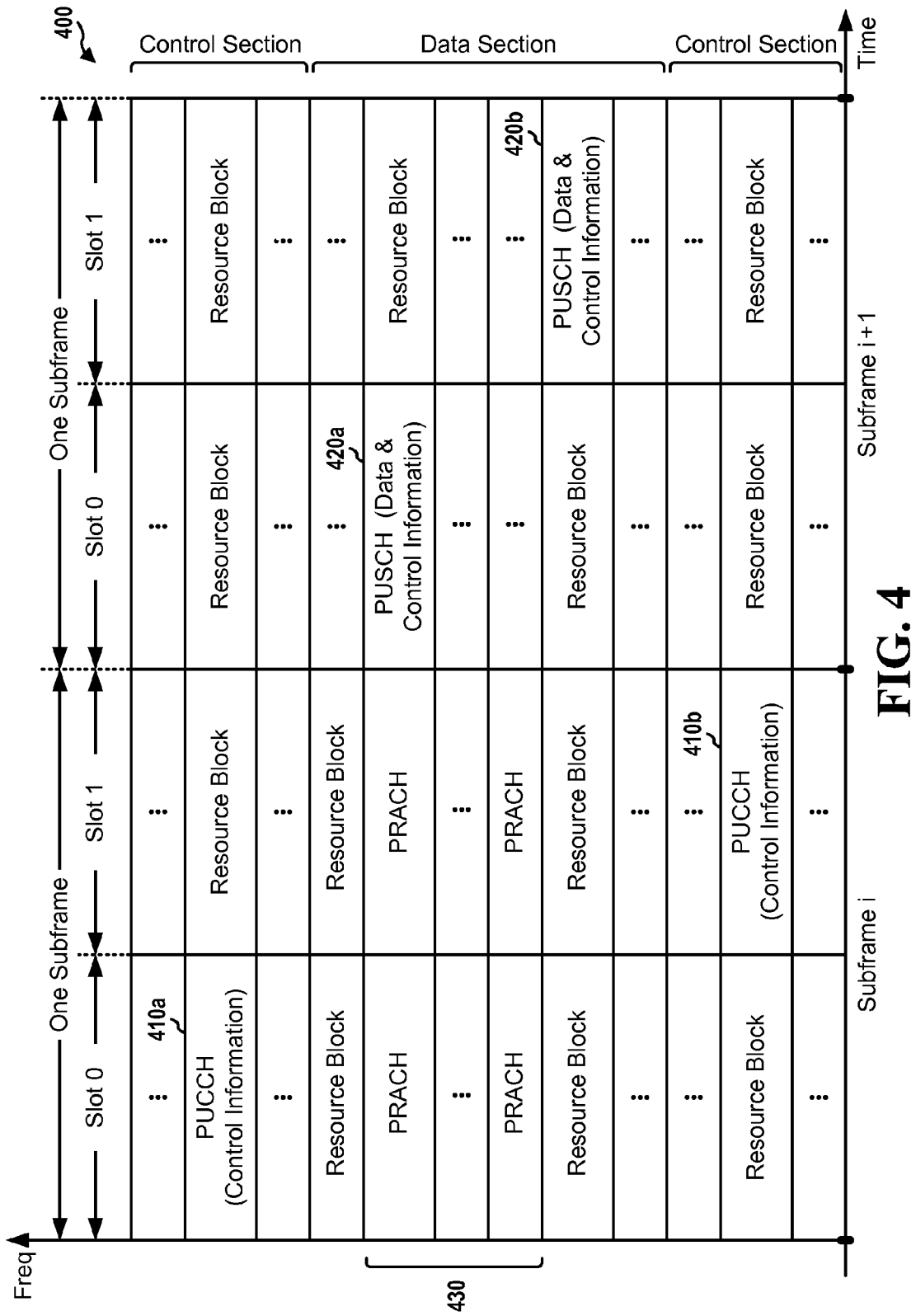
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
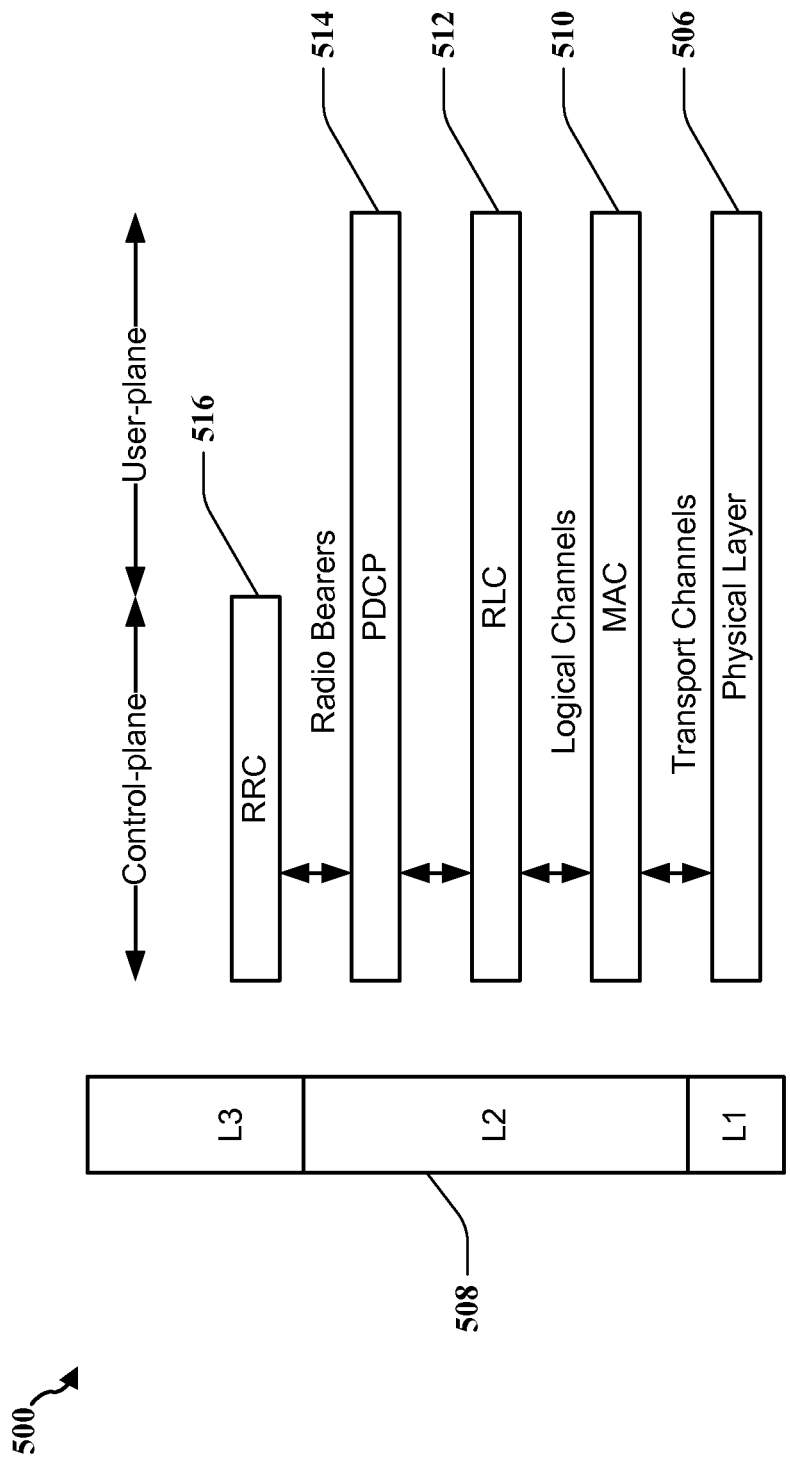
FIG. 5 is a diagram illustrating an example of a network protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
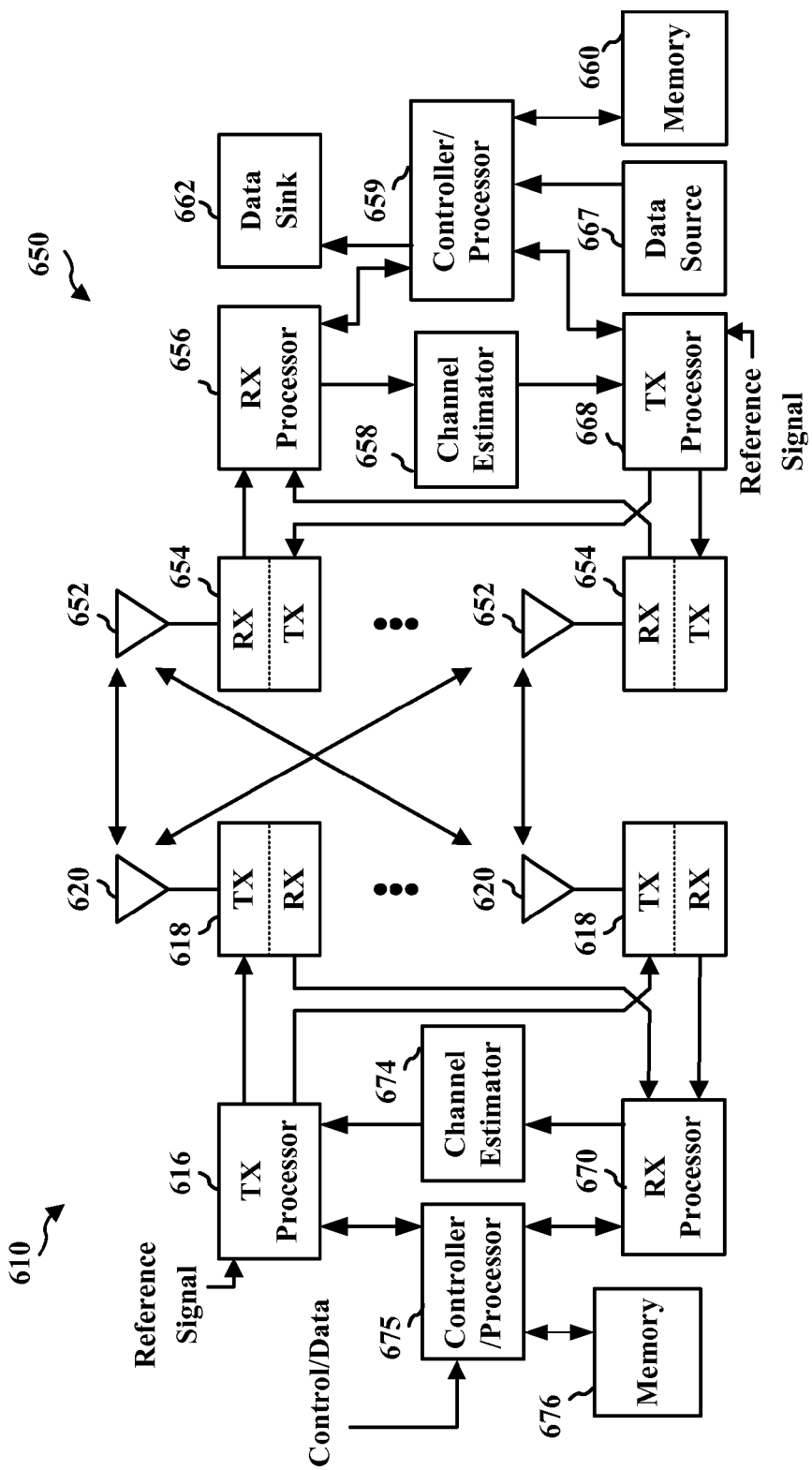
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
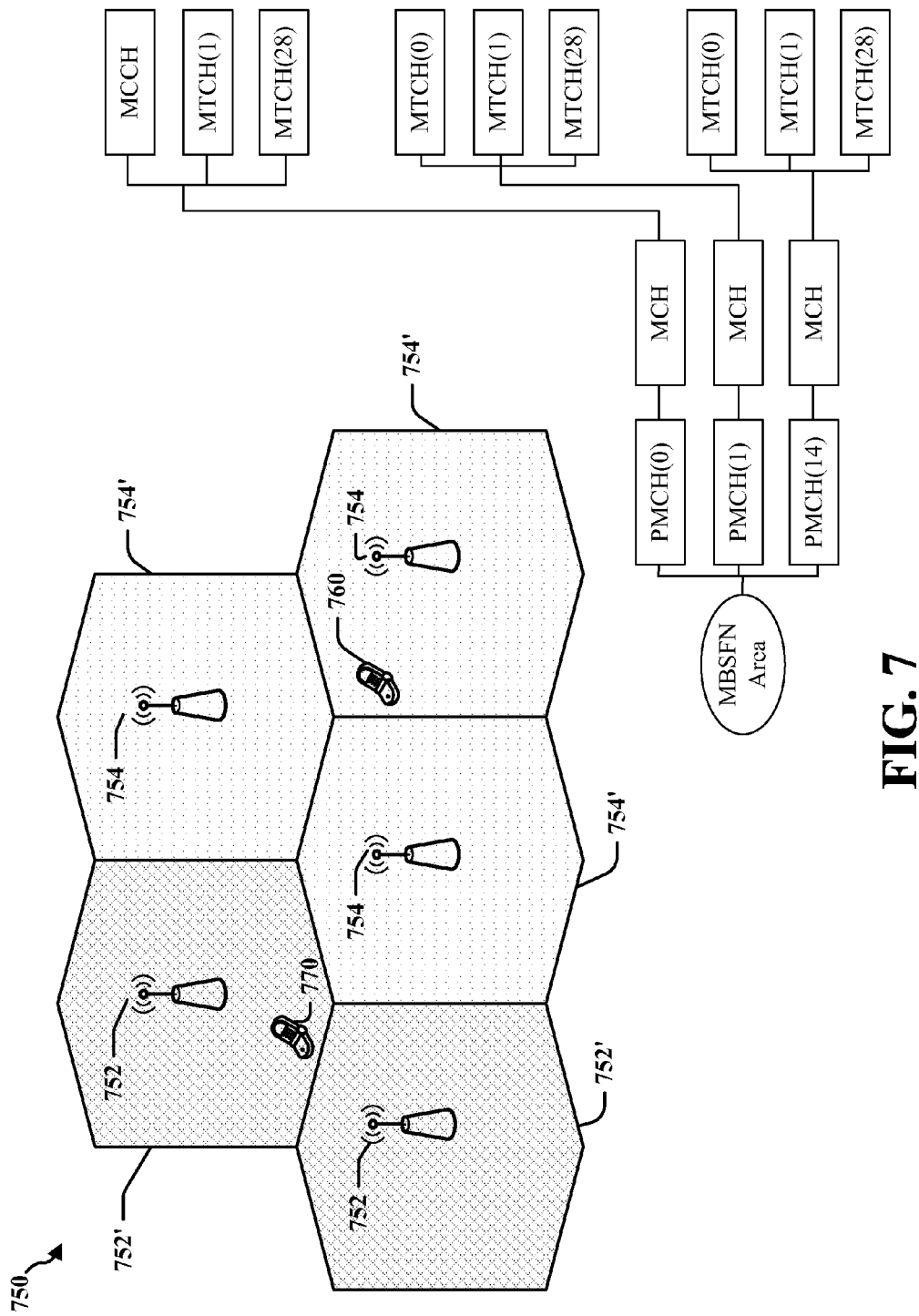
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multimedia Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
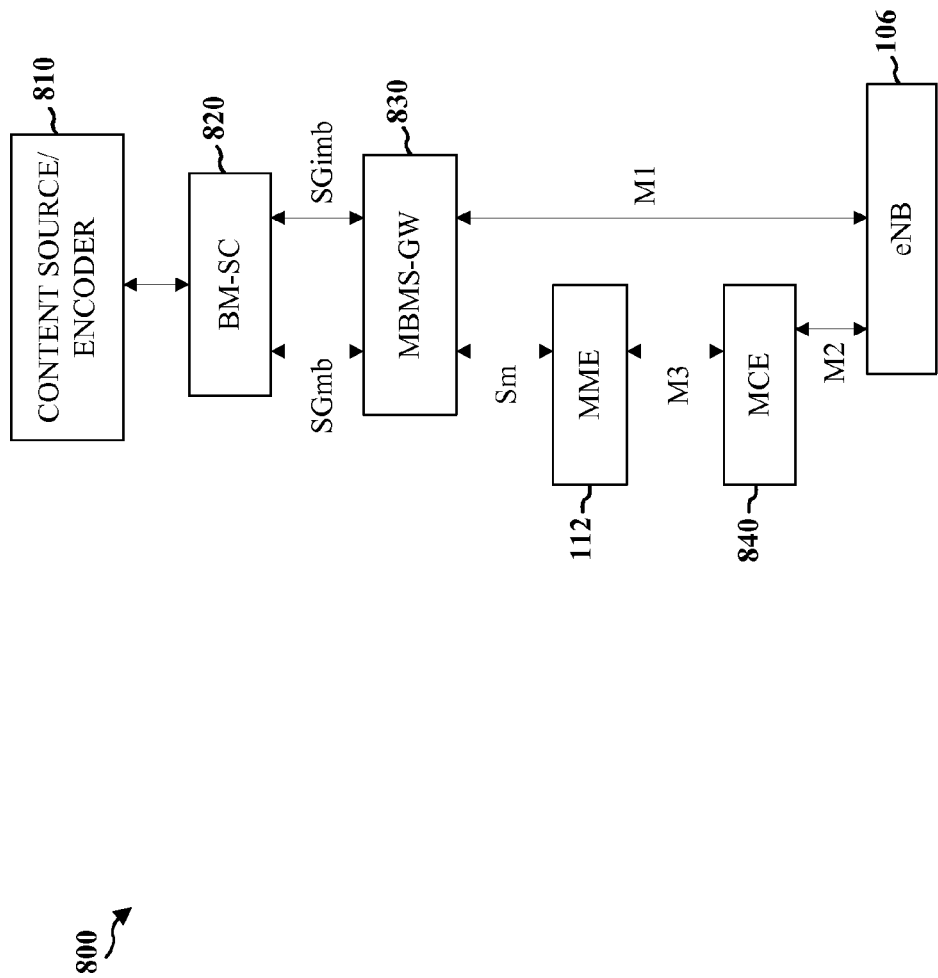
FIG. 8 is a diagram illustrating additional logical network entities that are compatible with the EPS.

FIG. 8 is a diagram 800 illustrating additional logical network entities that are compatible with the EPS 100. In FIG. 8, a broadcast multicast service center (BM-SC) 820 is a functional entity in charge of providing a service to a user. The BM-SC serves as an entry point for eMBMS transmissions arriving from a content source (CS) or encoder 810, or any other broadcast/multicast source providing content that is external to the EPS 100. The BM-SC 820 may include the CS/encoder 810. The BM-SC 820 may be responsible for providing: 1) authorization for terminals requesting to activate an MBMS service; 2) scheduling of broadcast and multicast sessions and allocating identifiers for each session (e.g., TMGI and Session ID); 3) initiating session start/stop; 4) integrity and confidentiality protection of MBMS data; and 5) MBMS session announcement.

An MBMS gateway (MBMS-GW) 830 is an entity that handles eMBMS user plane traffic and provides corresponding data packets to all eNBs (e.g., by broadcasting incoming eMBMS traffic to all eNBs) within a service area providing a particular service. The MBMS-GW 830 also performs MBMS session management, such as communicating a session start and a session stop, and collection of charging information relative to the distributed broadcast/multicast traffic for each terminal having an active MBMS session.

A multicell/multicast coordination entity (MCE) 840 is the controlling entity for an MBSFN area. The MCE may establish/delete radio bearers for eMBMS services according to session start/stop requests from an MME. The MCE may also define radio resource allocations for the services (e.g., subframe allocations and MCS for the services). Typically, there may be one MCE that controls all the eNBs belonging to an MBSFN area although more than one MCE can be associated with an MBSFN area. The MCE is responsible for allocating time and frequency resources for multicell MBMS transmission. As such, the MCE 840 performs scheduling on the radio interface.

As shown in FIG. 8, the BM-SC 820 and the MBMS-GW 830 communicate via an SGmb interface and an SGimb interface. The SGmb interface supports MBMS bearer signaling for setting up and releasing context at MBMS session establishment and termination. The SGmb interface also supports user-related signaling, e.g., for multicast session authorization, or user session joining or detachment. The SGimb interface supports the MBMS traffic plane.

The MBMS-GW 830 communicates with the eNB 106 via an M1 interface. The M1 interface also supports the MBMS traffic plane and makes use of a multicast protocol to deliver data packets to the eNB 106. The MBMS-GW 830 also communicates with the MME 112 via an Sm interface. The Sm interface is the reference point for the control plane between the MBMS GW 830 and the MME 112. The MME 112 communicates with the MCE 840 via an M3 interface. The M3 interface supports MBMS session control signaling, such as for session initiation and termination. The MCE 840 communicates with the eNB 106 via an M2 interface to provide the eNB 106 with radio configuration information.

Currently, a maximum bit rate (MBR) for a session may be set to be the same as a guaranteed bit rate (GBR) for eMBMS over the E-UTRAN. For example, for each session, the BM-SC sends quality of service (QoS) information including QoS class identifier (QCI), allocation/retention priority (ARP), and specifies MBR=GBR to the MBMS-GW. The MCE determines an aggregate bandwidth based on a per session QoS and decides which MTCHs are grouped together on what MCHs for a session based on the session QoS.

Accordingly, bandwidth allocation is fixed, e.g., each MBMS service utilizes a constant bandwidth and streams are communicated at a constant bit rate (CBR). Also, the setting of the MBR equal to the GBR for the session may not be changed if the QoS for a session update remains the same as for a session start.

However, the fixed bit rate design may be inefficient. For example, certain content streams, such as video signals, naturally have a variable bit rate. When a network has more resources available, it may be desirable to allocate more bandwidth to a video signal to provide a higher quality signal. Moreover, given the heterogeneous nature of video signals, parts of the video that are difficult to encode may require a higher bit rate, and parts of the video that are easier to encode may require a lower bit rate. Also, different content sources typically do not fully utilize their respective bandwidth at the same time (e.g., the aggregated bandwidth from several sources typically will be less than the total bandwidth allocated to the several sources).

Therefore, a QoS scheme that uses a fixed bandwidth may be disadvantageous because a more efficient variable rate cannot be sent from the BM-SC or content source/encoder. As such, MBMS quality may not be optimized and network resource usage may be less efficient.

In an aspect, a QoS scheme is provided that allows the allocation of variable bandwidth for each MBMS service. Specifically, a variable bit rate may be dynamically allocated to MBMS services. This may allow the network to optimize resource allocation between unicast and multicast services. For example, if the BM-SC/content source provides multicast services at GBR, and then later learns via feedback from the eNB/MCE that resources for unicast services are not being fully utilized, then the network may adjust the bit rate for providing the multicast services to a rate above GBR, up to an allowed MBR. Provision of the dynamic allocation is described below.

For each eMBMS session, the BM-SC specifies a QoS that allows a bit rate greater than or equal to GBR but less than or equal to MBR. This may be accomplished via signaling over various interfaces, such as the SGmb, Sm, and M3 interfaces. Also, the BM-SC may modify the QoS in a session update request message to adapt to the bandwidth needs of the content source/encoder, such as when the content source/encoder desires an increased transmission bit rate to deliver a higher quality service, for example. Based on an eNB's resource utilization, the eNB can send feedback (e.g., a report) to the MCE to request an increased or decreased bit rate.

The MCE may consolidate the reports from all eNBs to determine whether to request an increase or decrease in the MBMS session rate for one or more existing MBMS sessions. The decision on whether to request an increase or decrease in the MBMS session rate may be based on whether additional MBMS sessions are to be setup and/or a priority setting between different services.

The BM-SC may consolidate reports from all MCEs in a MBSFN area and determine the rate to be used for broadcast streaming via dynamic adaptive streaming over HTTP (DASH) or a real-time transport protocol (RTP). The interface between the BM-SC and content source/encoder leverages the existing interfaces as specified in DASH specifications or codec control messages in an RTP audio-visual profile with feedback.

Figure 9:
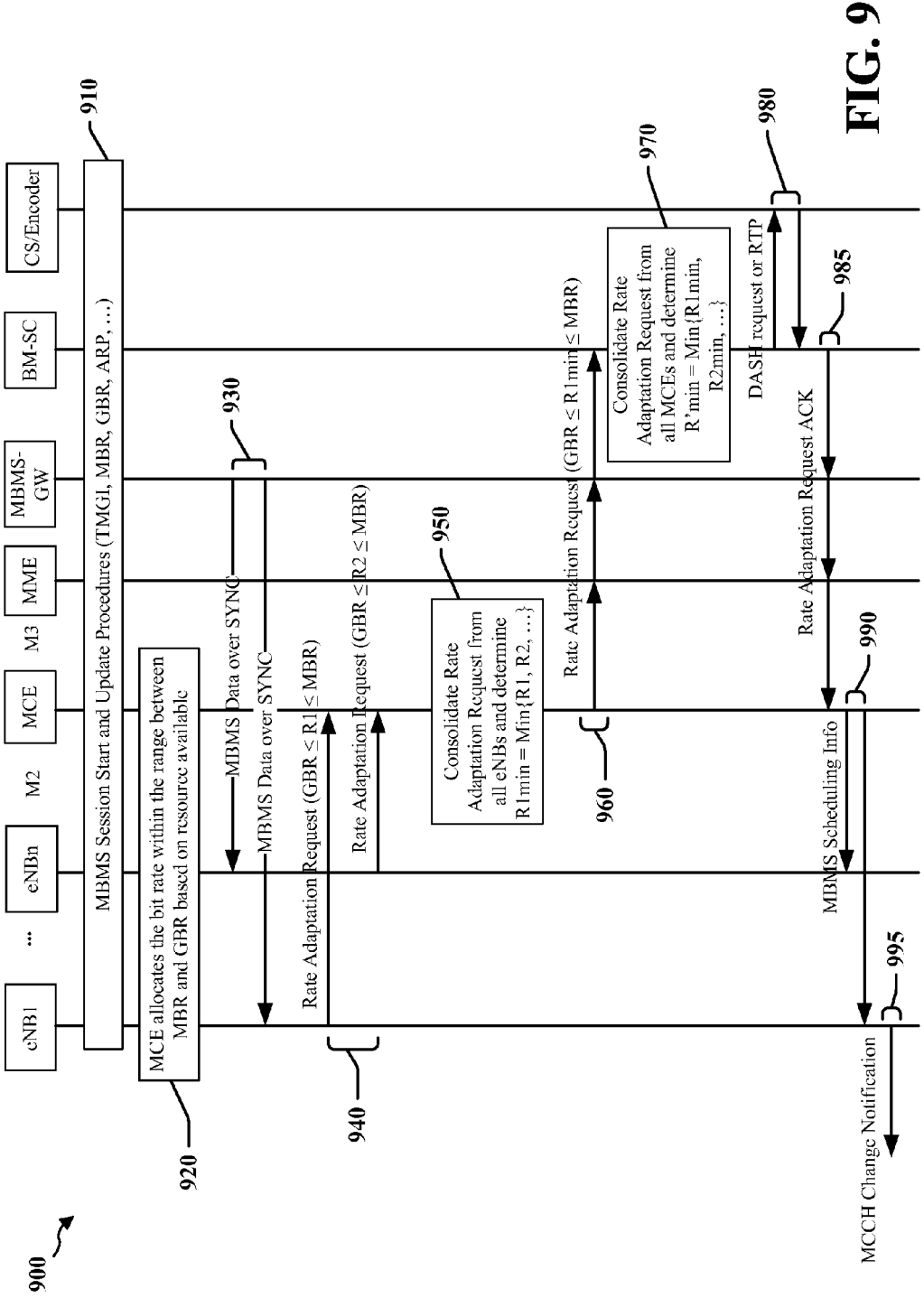
FIG. 9 is a diagram illustrating MBMS dynamic variable rate allocation.

FIG. 9 is a diagram 900 illustrating an example of MBMS dynamic variable rate allocation. At step 910, a network service center, such as the BM-SC establishes an MBMS session by sending an MBMS Session Start Request to the MBMS-GW to provide session attributes, such as a temporary mobile group identity (TMGI), QCI, MBR, GBR, ARP, etc. Here, MBR is allowed to be set greater than GBR. In addition, if the QoS requirement is changed by the content source/encoder, the BM-SC also sends an MBMS Session Update Request to the MBMS-GW to change the value of MBR and GBR. The MBMS Session Start Request and the MBMS Session Update Request may also include a list of bit rates sent from the content source/encoder. The list of bit rates may identify specific bit rates the content source/encoder is capable of supporting.

At step 920, a network coordination entity, such as the MCE, allocates to all base stations (e.g., eNBs) in an MBSFN area network resources within the range of GBR and MBR for the session. Specifically, the MCE may allocate resources based on one of the listed bit rates capable of being supported by the content source/encoder. The network resources may include radio resources and/or backhaul resources. The allocation is based on current resource availability. Thus, if additional resources are not available to provide service above the GBR for each session, the MCE may only guarantee resource allocation at GBR for each session. However, if additional resources are available, the MCE can allocate more resources to one or more sessions, e.g., based on session priorities, to increase the rate of one or more sessions, but not to a rate above the MBR.

At step 930, the MBMS-GW broadcasts MBMS data via a SYNC protocol. All eNBs within the same MBSFN area will buffer the MBMS data and transmit the same data at the same time over the air interface.

In an aspect, Operations, Administration, and Maintenance (OA&M) may configure a maximum capacity used for MBSFN subframes. If no MBMS packets are to be transmitted during an MBSFN subframe, the MBSFN subframe can be used for a unicast channel. The MCE and MME can coordinate with each other to dynamically allocate a resource between MBMS and unicast. Moreover, QCI and ARP may be used for determining resource allocation and admission control.

At step 940, one or more eNBs may decide to send a Rate Adaptation Request to the MCE to request a higher bit rate or lower bit rate. For example, an eNB may be using two subframes for carrying data for a MBMS session and have two additional subframes available to carry MBMS data. The eNB may send a Rate Adaptation Request with a bit rate equal to 200% of the current rate to the MCE. Another eNB may send a request for a new rate equal to 150% of the current rate. In another example, the eNB may send a Rate Adaptation Request to specifically request a rate within one of the listed bit rates capable of being supported by the content source/encoder.

Alternatively, the Rate Adaptation Request may be based on a current MBMS load, such as whether buffers are nearly full or nearly empty, for example, and/or based on a unicast load, such as whether the eNB is operating during a peak time period, for example. In particular, the eNB may anticipate when the buffers will be full or empty. Thus, the eNB may also send the Rate Adaptation Request to the MCE to request the lower or higher bit rate in anticipation of the full or empty buffer state. The Rate Adaptation Request may also be based on an availability of resources to increase a current rate or a lack of resources to maintain a current rate based on eNB load conditions (e.g., amount of unicast traffic or number of MBMS sessions being handled).

At step 950, the MCE consolidates the feedback (i.e., Rate Adaptation Requests) received from eNBs within a predetermined duration, such as a time period set by an operator's configurable timer. Based on the Rate Adaptation Requests received from the eNBs, the MCE determines a minimum bit rate (Rmin). For example, if all eNBs are requesting a rate increase, the MCE may set Rmin to the minimum of the rate requests. If any eNB requests a rate decrease, the MCE may set Rmin to the requested rate decrease. The MCE may also determine whether to admit more sessions by reducing the network resource assignment for existing sessions. In an aspect, the MCE may set Rmin to the minimum of the requested rates that are included in the list of bit rates capable of being supported by the content source/encoder.

At step 960, the MCE may send the consolidated Rate Adaptation Request containing Rmin to the BM-SC via the MME and MBMS-GW. At step 970, the BM-SC consolidates all feedback (i.e., consolidated Rate Adaptation Requests containing Rmin) from all MCEs received within a predetermined duration, such as a time period set by the operator's configurable timer. Based on the consolidated Rate Adaptation Requests, the BM-SC may determine a consolidated minimum bit rate R'min. The BM-SC may also determine whether a different session is needed for each MCE if the Rmin values reported from the different MCEs vary greatly, such as when the Rmin values differ by more than 30%, for example.

For example, assume GBR is equal to 500 kbps and MBR is equal to 900 kbps. Moreover, a first MCE (MCE1) requests a first minimum bit rate (R1min) of 600 kbps determined by consolidating feedback from all eNBs under MCE1's rate adaptation. A second MCE (MCE2) requests a second minimum bit rate (R2 min) of 700 kbps determined by consolidating feedback from all eNBs under MCE2's rate adaptation. Accordingly, based on the requests from MCE1 and MCE2, the BM-SC can determine the consolidated minimum bit rate R'min to be 600 kbps, and send a request to the content source/encoder to assure that the data rate is equal to the determined R'min.

In another example, MCE1 may request an R1min of 600 kbps while MCE2 requests an R2 min of 900 kbps. Here, the BM-SC may determine that the Rmin values reported from MCE1 and MCE2 vary by more than a certain amount (e.g., differ by more than 30%), and therefore may decide that two sessions should be used to handle the load at each MCE. Accordingly, the BM-SC may create two different sessions, one session for MCE1 at a bit rate of 600 kbps and a second session for MCE2 at a bit rate of 900 kbps. Accordingly, MCE2 is provided with a higher bit rate because MCE2 has more resources allocated to MBMS services.

At step 980, if DASH is used for video streaming, the BM-SC will translate R'min directly into DASH requests for media encoded at a rate lower than or equal to R'min, and greater than or equal to GBR. If RTP is used for video streaming, the BM-SC may determine the lowest temporary maximum media stream bit rate request (TMMBR) and send it directly to the content source/encoder. The BM-SC may have knowledge of the bit rates that the content source/encoder is capable of providing. Accordingly, when sending a rate adjustment request to the content source/encoder, the BM-SC may select a bit rate that is less than or equal to R'min.

At step 985, the BM-SC receives a Rate Adaptation Request Acknowledgment (ACK) from the content source/encoder, and may send the ACK to the MCE via the MBMS-GW and MME. At step 990, upon receiving the ACK from the BM-SC, the MCE sends MBMS scheduling information to the eNBs. Thereafter, at step 995, the eNBs inform UEs of the rate adaptation by sending an MCCH notification message to the UEs during a next MCCH modification period.

In an aspect, the content source/encoder may desire to have its content transmitted at a higher or lower bit rate. Accordingly, the content source/encoder may send a Rate Adaptation Request to the BM-SC to request a higher bit rate or lower bit rate for content transmission.

Further details for providing an efficient variable rate for a broadcast/multicast service will be described below. In the description, network entities eNB, MCE, and BM-SC are specifically described. However, the eNB may be a base station, access point, or other similar network entity; the MCE may be a network coordination entity other similar network entity; and the BM-SC may be a network service center or other similar network entity. In an aspect, the BM-SC sends the MBR, which is equal to the GBR, to the MCE. The MCE then allocates network resources to all eNBs in an MBSFN area based on the MBR of each session sent from the BM-SC. An eNB then schedules MCH scheduling information (MSI) based on a SYNC-PDU from the MBMS-GW. The SYNC-PDU contains a timestamp that indicates the start time of a synchronization sequence, and is the same for all eNBs in the MBSFN area. If no MBMS data will be transmitted during this subframe, or if the resources are no longer used for MBMS, the eNB can use the MBSFN network resources for a unicast communication.

In a further aspect, the BM-SC sends the requested MBR and GBR to the MCE. The MCE then allocates network resources to all eNBs in an MBSFN area based on the MBR and GBR of each session received from the BM-SC. When an eNB observes less data coming from the MBMS-GW via the SYNC protocol, and realizes extra MBMS resources are available for a session, the eNB may notify the MCE about such realization. Here, a single report from one eNB is sufficient to represent the observations of all eNBs within the MBSFN area because all eNBs within the MBSFN area receive the same SYNC-PDU. Accordingly, based on the report from the eNB, the MCE can admit more MBMS sessions by reducing the network resource assignment for the existing sessions, e.g., down to the GBR. Similarly, when the eNB observes more data coming from the MBMS-GW via the SYNC protocol, and realizes that a physical transmission rate has been exceeded, the eNB notifies the MCE. Based on the report from the eNB, the MCE can allocate more network resources to the eNB if available, e.g., up to the MBR, or allocate less network resources to the eNB down to the GBR if the network resources are not available. The allocation may be provided to all eNBs in the session since all eNBs transmit a same waveform.

In another aspect, the MCE allocates network resources to all eNBs in an MBSFN area for each session starting at a rate greater than GBR. Thereafter, the MCE may downgrade the resource allocation to the GBR of the existing session upon the occurrence of an event. For example, the event may occur when the MCE decides to schedule a new session. In another example, the event may occur when one or more eNBs in the MBSFN area have an abundance of unicast traffic and indicate that resources for maintaining a bit rate greater than GBR are not available.

An example of the MCE downgrading the resource allocation is as follows. Assume an entire bandwidth for serving both unicast traffic and MBMS traffic is 16,000 kbps. Moreover, each transmitted session has the following attributes: MBR is equal to 800 kbps, GBR is equal to 500 kbps, and maximum MBMS usage is 40%. Accordingly, the MCE can allow MBMS usage to fluctuate between 25% and 40%, for example, to accommodate unicast traffic variations. For example, if eight MBMS sessions are currently transmitted at the bit rate MBR (e.g., the MBMS usage is 8 sessions×800 kbps/16,000 kbps=40%), the MCE can maintain the same number of sessions by adjusting the bit rate to GBR (500 kbps), which yields a downgraded MBSFN usage of 25% (e.g., 8 sessions×500 kbps/16,000 kbps=0.25 (25%)). Alternatively, the MCE can decide to downgrade MBSFN usage to 25% independent of the number of sessions transmitted. For example, if the bit rate is adjusted to GBR (500 kbps), then a total of eight MBMS sessions may be allowed (e.g., 0.25×16,000 kbps/500 kbps=8 sessions). In another example, if the bit rate is adjusted to MBR (800 kbps), then a total of five MBMS sessions may be allowed (e.g., 0.25×16,000 kbps/800 kbps=5 sessions).

In addition to the MCE downgrading the resource allocation, the MCE may also control how the eNBs are to drop data packets when the eNBs are unable to maintain a rate equal to the GBR (e.g., when the rate has been adjusted to GBR and one or more eNBs in the MBSFN area request a further rate decrease). The MCE may signal a packet dropping rule to the eNBs indicating a packet dropping algorithm. Notably, all eNBs follow the same packet dropping rule to guarantee MBSFN transmission. Examples of dropping algorithms include random dropping based on an MBSFN area identity (ID) and uniform dropping. In random dropping, the MBSFN area ID is used as a random seed to generate a pseudo-noise (PN) sequence, which is the dropping pattern. In uniform dropping, the first packet out of every 10 additional packets is dropped. In the event that all eNBs in the MBSFN area indicate to the MCE that resources for maintaining a bit rate greater than GBR, or equal to MBR, are available, then the MCE may send a signal to the eNBs to reduce or cease packet dropping.

In a further aspect, bit rate adaptation in the BM-SC may be based on MCE feedback. Initially, the BM-SC may indicate an adaptation algorithm, e.g., rate-based or buffer-based, to the MCE in addition to MBR and GBR parameters through session start procedures. Alternatively, the network (e.g., BM-SC and MCE/MME) may be preconfigured with the adaptation algorithm via OA&M.

The MCE allocates network resources for each session based on the MBR and GBR indicated from the BM-SC. Thereafter, when the MCE realizes that additional resources are available based on feedback from the eNBs, the MCE begins to allocate more resources for higher priority sessions but not to more than MBR. The MCE notifies the BM-SC of the resource allocation adjustment. The MCE also notifies the eNBs of the adjustment via MCCH at a boundary of each MCCH modification period. When the MCE realizes that fewer resources are available based on feedback from the eNBs, the MCE begins to de-allocate resources for lower priority sessions but not to less than GBR. Again, the MCE notifies the BM-SC of the resource allocation adjustment. Furthermore, the eNBs are also notified of the adjustment via MCCH at a boundary of each MCCH modification period. Accordingly, whether the MCE allocates more resources for higher priority sessions or de-allocates resources for lower priority sessions, the BM-SC can signal the content source/encoder to generate packets at an adjusted bit rate based on the feedback from the MCE.

In an aspect, a type of the rate adaptation messages exchanged between the eNB/MCE and the BM-SC will depend on a transport protocol between the BM-SC and the content source/encoder. An example of a transport protocol between the BM-SC and the content source/encoder is the DASH protocol. If DASH is used as the transport protocol, the eNB/MCE determines a new rate R to be used and signals R to the BM-SC. The BM-SC then determines a lowest rate (Rmin) requested among all eNBs/MCEs in the MBSFN area, wherein GBR≤Rmin≤MBR. Moreover, the BM-SC translates Rmin directly into DASH requests for media encoded at a rate lower than or equal to Rmin, and greater than or equal to GBR.

Alternatively, when DASH is used as the transport protocol, the eNB/MCE sends a buffer status S to the BM-SC to request rate adaptation. The buffer status S may include one or more parameters regarding a buffer state, such as an amount of data left in the buffer, a time-stamp of newest data in the buffer, or an amount of space left in the buffer before buffer overflow occurs, etc. The BM-SC may be kept up-to-date regarding the buffer status via frequent messaging. Accordingly, the BM-SC can determine which eNB buffer is in the most critical state from among the different reports received from the eNBs/MCEs. Also, the BM-SC may have algorithms similar to a DASH client for determining what media encodings to request from the content source/encoder based on the buffer status S. To lessen the amount of signaling, the eNBs/MCEs may send the buffer status S only when rate adaptation is urgent, such as when buffer occupancy is too low or too high, for example. Whether the buffer occupancy is too low or too high may be determined by operators via OA&M. For example, when the buffer occupancy is less than or equal to one-fourth of a full buffer, the buffer occupancy may be considered too low, and when the buffer occupancy is greater than or equal to three-fourths of the full buffer, the buffer occupancy may be considered too high.

Another example of a transport protocol between the BM-SC and the content source/encoder is the RTP. When RTP is used as the transport protocol, the eNB/MCE may determine a new rate R to be used and signals R to the BM-SC. The BM-SC then determines a lowest TMMBR request from among all eNBs/MCEs in the MBSFN area, and sends the lowest TMMBR directly to the content source/encoder.

Alternatively, when RTP is used as the transport protocol, the eNB/MCE may send a Next Application Data Unit (NADU) application specific message (APP) packet to the BM-SC to request rate adaptation. The BM-SC may be kept up-to-date regarding the buffer status by receiving NADU APP packets from the eNB/MCE frequently over time. Accordingly, the BM-SC can determine which eNB buffer is in the most critical state from among the different reports received from the eNBs/MCEs. And, the BM-SC forwards the NADU APP packet of the buffer in the most critical state. To lessen the amount of signaling, the eNBs/MCEs may send the buffer status S only when rate adaptation is urgent, such as when buffer occupancy is too low (e.g., below a low threshold) or too high (e.g., above a high threshold), for example. As stated previously, whether the buffer occupancy is too low or too high may be determined by operators via OA&M. For example, when the buffer occupancy is less than or equal to one-fourth of a full buffer, the buffer occupancy may be considered too low, and when the buffer occupancy is greater than or equal to three-fourths of the full buffer, the buffer occupancy may be considered too high.

In an aspect, a type of feedback message communicated between the eNBs/MCEs and the BM-SC/content source may be preconfigured. For example, a mobile network operator (MNO) and the content source/encoder may agree on a delivery protocol (e.g., DASH or RTP) and rate signaling feedback (e.g., HTTP GET, TMMBR, or NADU APP packet). Accordingly, the MNO provisions appropriate message types to be used between the eNB/MCE and the BM-SC/content source.

In a further aspect, the type of feedback message communicated between the eNBs/MCEs and the BM-SC/content source may be negotiated prior to broadcast of content. For example, the BM-SC determines a transport and feedback message type supported by the content source/encoder. Based on the availability of a media presentation description (MPD), the BM-SC may select DASH. Accordingly, the BM-SC can determine whether to use rate information or buffer status as the feedback type. Alternatively, based on a session description protocol (SDP), the BM-SC can select RTP. As such, the BM-SC can negotiate use of TMMBR as the feedback type if an attribute related to TMMBR is present in the SDP. The BM-SC can also negotiate use of NADU APP packet as the feedback type if an attribute related to NADU APP packet is present in the SDP. Thereafter, the BM-SC can indicate to the MCEs/eNBs what feedback message type to use in a new message sent from the BM-SC to the MCE.

In another aspect, to minimize signaling/feedback from the E-UTRAN to the BM-SC, the MCE can consolidate the feedback from the eNBs, and send the consolidated feedback to the BM-SC. The MCE can specify a threshold that needs to be reported by the eNBs, such as a buffer threshold or a rate threshold for MBMS. For example, for buffer-based reporting, the MCE may ask the eNBs to report if a buffer occupancy is less than or equal to one-fourth of a full buffer, or if the buffer occupancy is greater than or equal to three-fourths of the full buffer. For rate-based reporting, assuming MBR is equal to 800 kbps and GBR is 500 kbps, the MCE may ask the eNBs to report if a step of rate change is at least 100 kbps. For example, the eNBs may report if a current rate is 500 kbps, and resources available at the eNBs allow a rate of 600 kbps to be requested.

However, due to the distance between the eNBs and the BM-SC, different eNBs may report at different times. Accordingly, the MCE can hold received reports for a configured time, consolidate the reports, and send a rate adaptation request to the BM-SC based on the consolidated reports. The MCE may also use the first report received from an eNB, which is most likely the nearest eNB, to send the rate adaptation request to the BM-SC.

In an aspect, coordination between unicast and MBMS communication is considered with respect to sending feedback messages. For example, the eNB, MCE, and MME can coordinate with each other before sending feedback to the BM-SC. As such, when the MME receives a rate adaptation request from the MCE, the MME may also consider a unicast resource allocation status to modify the rate adaptation request before sending the request to the BM-SC.

In another example, the eNB may determine available MBMS resources by considering both unicast and MBMS resources used for current services (e.g., load) before sending feedback to the MCE. Here, a low unicast load may occur when few UEs request a unicast channel, such as during an off-peak hour. A high unicast load may occur when many UEs request a unicast channel while resources allocated for unicast channels are close to being exhausted, such as during a peak hour. A low MBMS load may occur when no additional MBMS sessions are requested and resources allocated for MBMS are not exhausted, and therefore, the MBMS can be provided using a higher rate near MBR. A high MBMS load may occur when additional MBMS sessions are requested and resource allocated for MBMS are close to being exhausted, and therefore, the MBMS sessions can be provided using a lower rate near GBR. Notably, network resources can be dynamically allocated between unicast services and MBMS services based on both loading situations.

If unicast load is high and MBMS services use resources at a rate above GBR, then the eNB may request a lower bit rate for MBMS services via feedback to reduce the MBMS services rate down to GBR. If unicast load is high and no MBMS services use resources at a rate above GBR, then the eNB may not send feedback. If unicast load is low and MBMS load is low, then the eNB may send feedback to allow the BM-SC to add additional MBMS services, or increase the session rate from GBR to a higher rate not to exceed MBR. If unicast load is low, MBMS load is high, and MBMS services are using resources at a rate above GBR, then the eNB may send feedback to allow the BM-SC to reduce the MBMS services rate to GBR and add additional MBMS services.

The unicast load and MBMS load may be calculated based on utilization of radio resources and buffer resources. Radio utilization is equal to an average of radio resource used versus a total available radio resource in a given period of time T. Buffer utilization is equal to an average buffer size used versus a total available buffer size in a given period of time T. Accordingly, a high load is considered to be when an average radio utilization and an average buffer utilization exceed a threshold.

Figure 10:
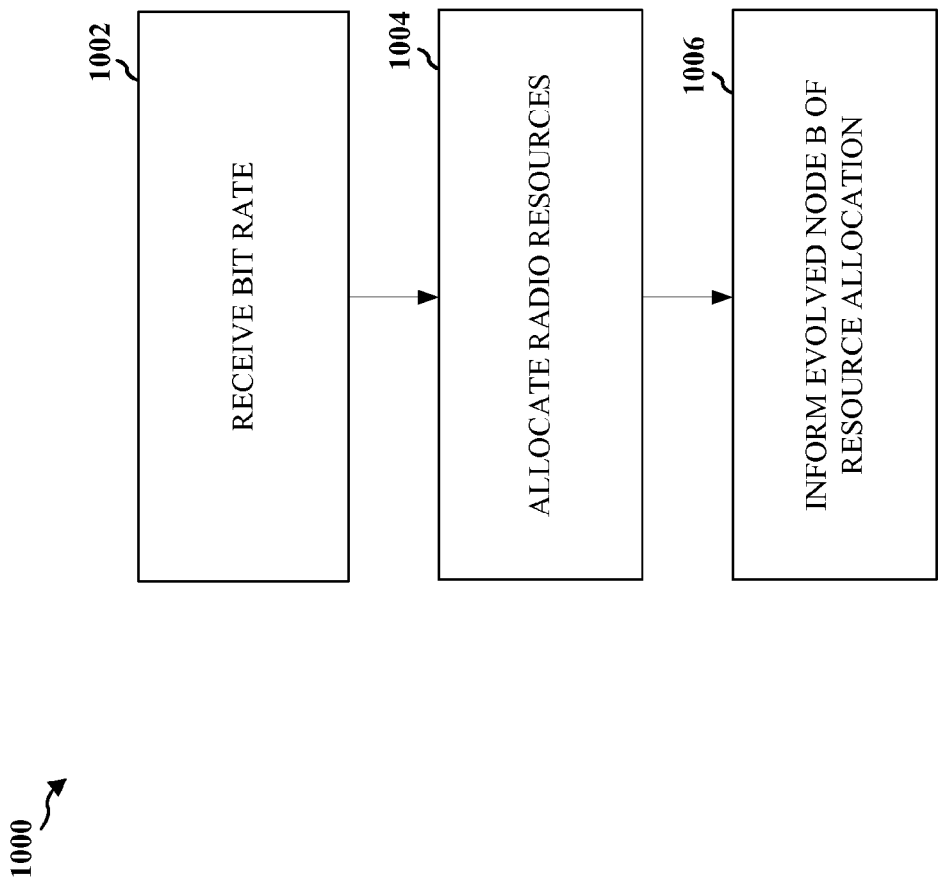
FIG. 10 is a flow chart of a method of wireless communication.

FIG. 10 is a flow chart 1000 of a method of wireless communication for allocating network resources based on a bit rate. The method may be performed by an MCE.

At step 1002, the MCE receives at least one bit rate from a BM-SC. Particularly, the at least one bit rate is a maximum bit rate (MBR), wherein the MBR is equal to a guaranteed bit rate (GBR). Moreover, the at least one bit rate can be updated after a start of an MBMS session via an MBMS session update request, for example, based on content from a content source/encoder.

At step 1004, the MCE allocates network resources based on the at least one bit rate. The network resource allocation is to be used by all eNBs in an MBSFN area in order to receive data from the BM-SC through the MBMS-GW, and via a SYNC protocol, for example.

At step 1006, the MCE informs all the eNBs in the MBSFN area of the network resource allocation. Upon receiving the resource allocation, the eNBs know at what bit rate data from the BM-SC will be received, and may subsequently begin to receive data at the bit rate. Notably, when the network resources are not used for MBMS, the resources may be used for unicast services.

Figure 11:
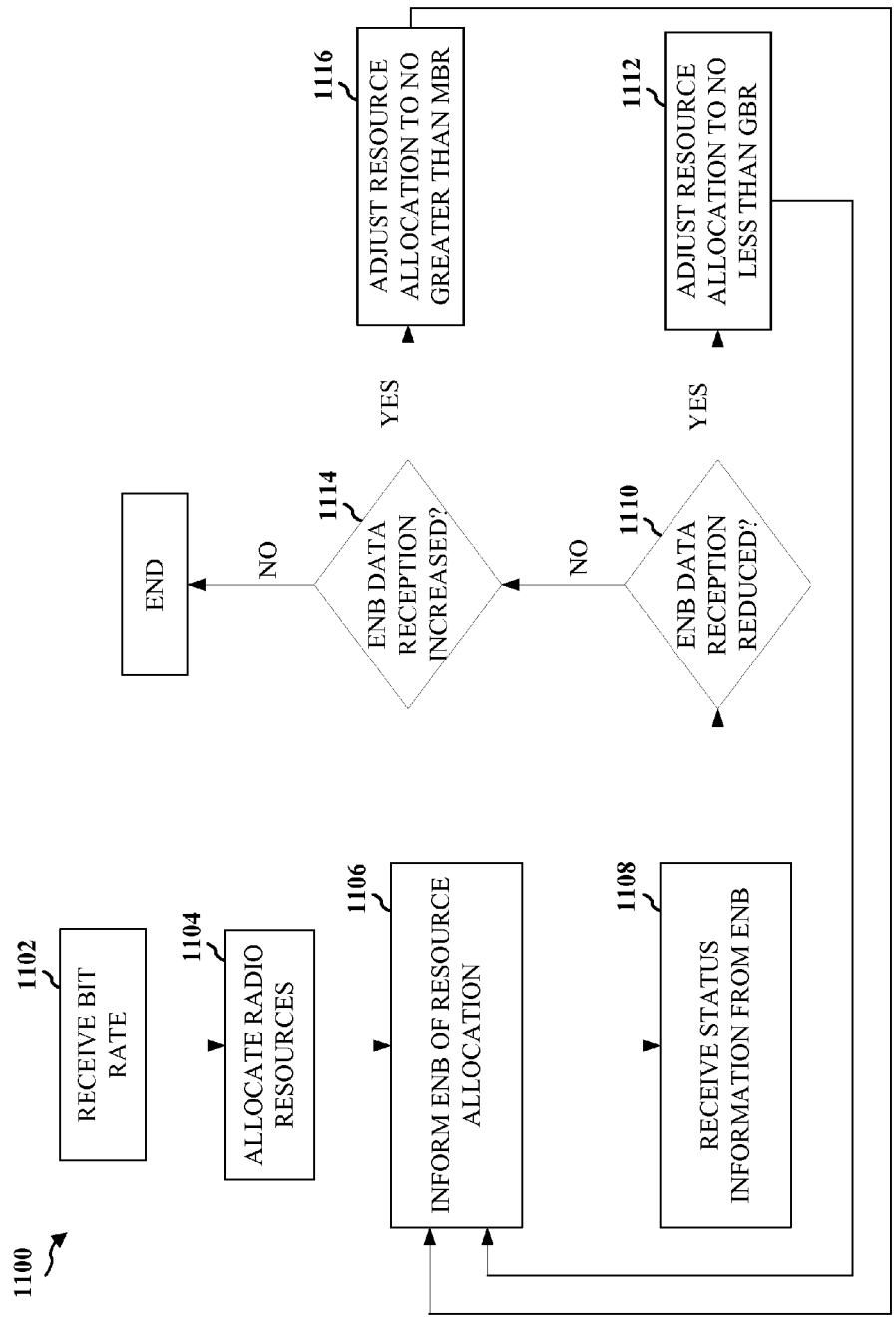
FIG. 11 is a flow chart of a method of wireless communication.

FIG. 11 is a flow chart 1100 of a method of wireless communication for adjusting a network resource allocation when eNBs provide feedback on resource utilization. The method may be performed by an MCE.

At step 1102, the MCE receives two bit rate values requested from a BM-SC. The two bit rate values may be MBR and GBR. Bit rate values can be updated after a start of an MBMS session via an MBMS session update request, for example, based on content from a content source/encoder.

At step 1104, the MCE allocates network resources for a session based on a requested bit rate between MBR and GBR. As such, the network resource allocation will be used by all eNBs in an MBSFN area in order to receive data from the BM-SC through the MBMS-GW, and via a SYNC protocol, for example.

At step 1106, the MCE informs all the eNBs in the MBSFN area of the network resource allocation. Upon receiving the resource allocation, the eNBs know at what bit rate data from the BM-SC will be received, and may subsequently begin to receive data at the bit rate.

At step 1108, the MCE receives from at least one eNB in the MBSFN area status information indicating a change in an amount of data being received by the at least one eNB via the allocated network resources. For example, the status information may indicate an eNB buffer status (e.g., eNB buffer nearly empty or nearly full), or that an eNB has extra resources available or requires additional resources. The received status information may also be referred to as the rate adaptation request since the eNB may provide the status information for the purpose of adjusting a current bit rate at which data is received.

At step 1110, the MCE determines whether the received status information indicates that the at least one eNB receives a reduced amount of data. The MCE may use the determination to provide the BM-SC with information for deciding whether the current bit rate is to be adjusted. Upon the BM-SC deciding to adjust the current bit rate, the BM-SC may negotiate an adjusted bit rate with a content source/encoder. Thereafter, the content/source encoder may provide data at the adjusted bit rate (or maximum bit rate capable of being provided by the content source/encoder). The BM-SC may then inform the MCE of the adjusted bit rate allowing the MCE to adjust a resource allocation accordingly. For example, if the eNB experiences light traffic, then the MCE may decide to dedicate less resources to the eNB, and use the spare resources for allocation to other higher priority sessions, or to admit additional new sessions.

At step 1112, if the received status information indicates that the at least one eNB receives a reduced amount of data (e.g., eNB buffer nearly empty or eNB has additional resources), then the MCE proceeds to reduce an amount of allocated network resources.

At step 1114, the MCE determines whether the received status information indicates that the at least one eNB receives an increased amount of data. Again, the MCE may use the determination to provide the BM-SC with information for deciding whether the current bit rate is to be adjusted. Upon the BM-SC deciding to adjust the current bit rate, the BM-SC may negotiate an adjusted bit rate with the content source/ encoder. Thereafter, the content/source encoder may provide data at the adjusted bit rate (or maximum bit rate capable of being provided by the content source/encoder). The BM-SC may then inform the MCE of the adjusted bit rate allowing the MCE to adjust a resource allocation accordingly. In another example, if the eNB experiences heavy traffic, then the MCE may decide to dedicate more resources to the eNB so that the eNB may transmit a higher quality signal.

At step 1116, if the received status information indicates that the at least one eNB receives an increased amount of data (e.g., eNB buffer nearly full or eNB requires additional resources), then the MCE proceeds to increase an amount of allocated network resources. Particularly, the MCE increases the amount of allocated network resources up to MBR, the maximum allowed by the BM-SC. That is, the increased amount of allocated network resources may be less than or equal to MBR, but not greater than MBR.

Figure 12:
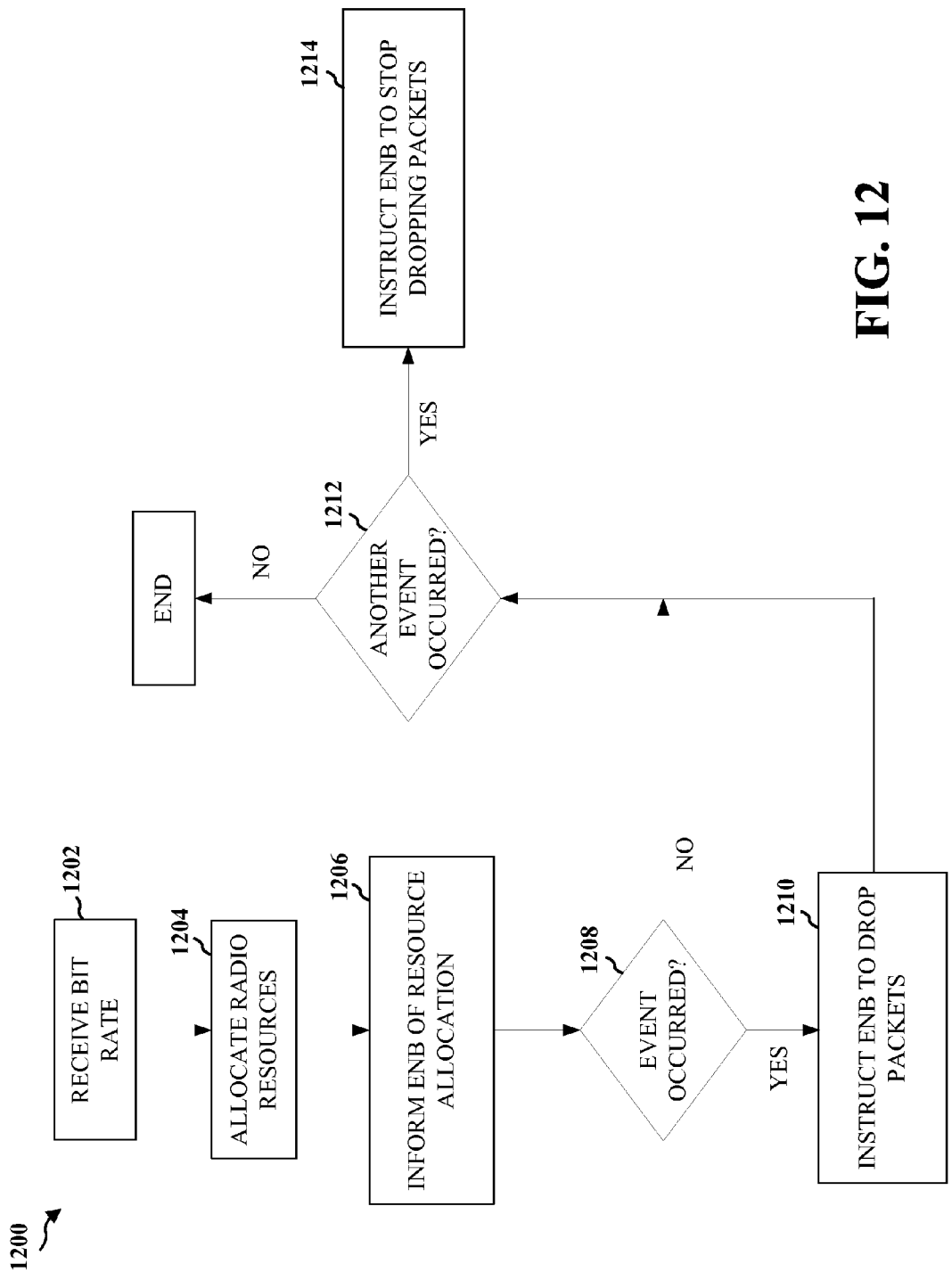
FIG. 12 is a flow chart of a method of wireless communication.

FIG. 12 is a flow chart 1200 of a method of wireless communication for adjusting a network resource allocation. The method may be performed by an MCE.

At step 1202, the MCE receives two bit rate values from a BM-SC. Particularly, the two bit rate values are MBR and GBR. Bit rate values can be updated after a start of an MBMS session via an MBMS session update request, for example, based on content from a content source/encoder.

At step 1204, the MCE allocates network resources based on a bit rate greater than GBR. As such, the network resource allocation will be used by all eNBs in an MBSFN area in order to handle data received from the BM-SC through the MBMS-GW, and via a SYNC protocol, for example, at the bit rate greater than GBR.

At step 1206, the MCE informs all the eNBs in the MBSFN area of the network resource allocation. Upon receiving the resource allocation, the eNBs know at what bit rate data from the BM-SC will be received, and may subsequently begin to receive data at the bit rate.

At step 1208, the MCE determines whether a particular event occurs. Based on the occurrence of the event, the MCE may determine that the current bit rate needs to be adjusted and sends a rate adaptation request to the BM-SC for adjusting the current bit rate. For example, if the MCE receives from at least one eNB in the MBSFN area information indicating an unavailability of network resources to maintain the current bit rate, then the MCE may send the rate adaptation request to the BM-SC, and the BM-SC may decide to adjust the current bit rate in order for the at least one eNB to meet GBR. In another example, the MCE may determine to allow a new session to be scheduled. Accordingly, because resources would need to be allocated for the new session, the MCE may send the rate adaptation request to the BM-SC, and the BM-SC may decide to adjust the current bit rate for an existing session in order to free up resources for the new session.

At step 1210, if the event occurs (e.g., eNB indicates no resources available to maintain current bit rate, or MCE decides to admit new session), then the current bit rate is adjusted to no less than GBR in order to maintain the guaranteed bit rate specified by the BM-SC. Moreover, the MCE may instruct the at least one eNB to drop data packets according to a predetermined packet dropping rule when the available network resources cannot meet GBR.

At step 1212, the MCE determines whether another event occurs. Based on the occurrence of another event, the MCE may determine that the current bit rate needs to be adjusted again and sends a rate adaptation request to the BM-SC for adjusting the current bit rate. For example, if the MCE receives from all eNBs in the MBSFN area information indicating an availability of network resources to meet MBR, then the MCE may send the rate adaptation request to the BM-SC, and the BM-SC may decide to adjust the current bit rate in order for the eNBs to transmit a higher quality signal.

At step 1214, if the other event occurs (e.g., all eNBs indicate resources available to meet MBR), then the MCE may instruct the eNBs to cease packet dropping. Moreover, the current bit rate is adjusted to no greater than MBR, the maximum allowed by the BM-SC, upon the occurrence of the other event. For example, each eNB may send a rate request to the MCE and the MCE uses the minimum of the requests as the requested rate to send to the BM-SC. The BM-SC then uses the minimum of the requests received from all MCEs as the rate to which the current bit rate is adjusted. The current bit rate may be further modified based on bit rates that a content source/encoder is capable of providing.

Figure 13:
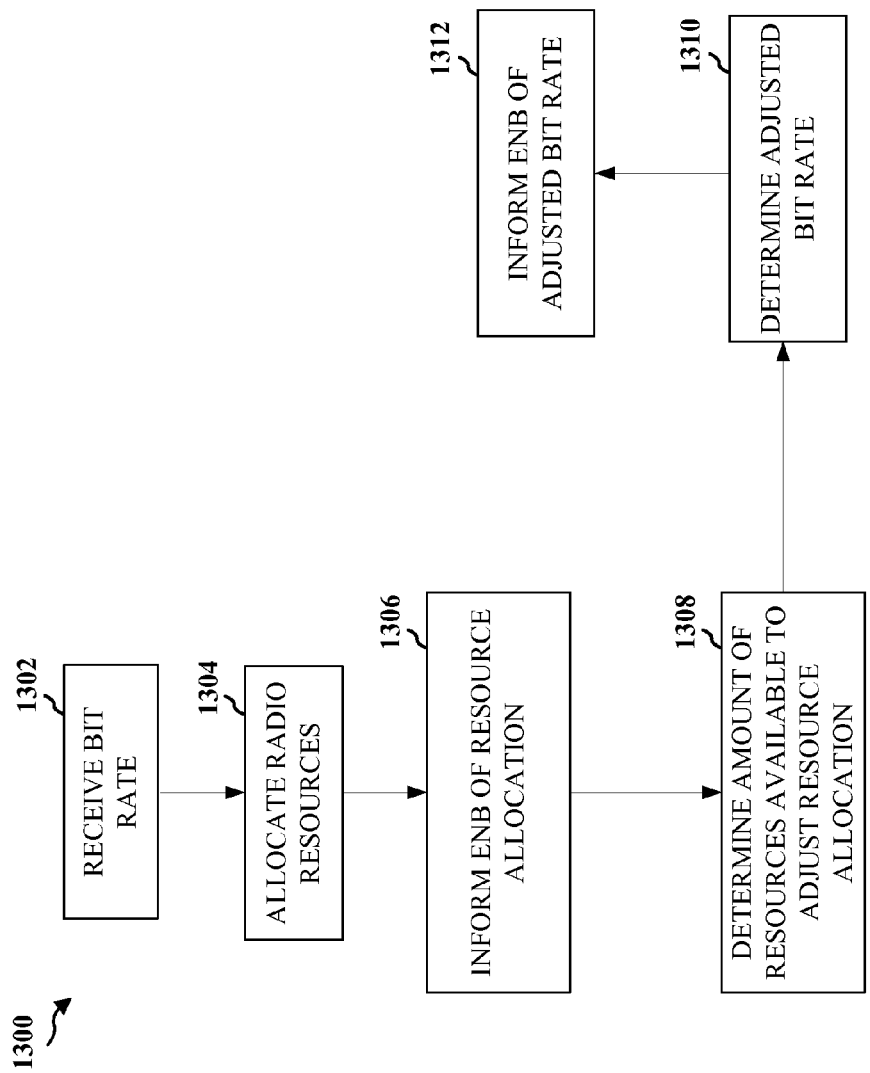
FIG. 13 is a flow chart of a method of wireless communication.

FIG. 13 is a flow chart 1300 of a method of wireless communication for adjusting a network resource allocation. The method may be performed by an MCE.

At step 1302, the MCE receives two bit rate values from a BM-SC. Particularly, the two bit rate values are MBR and GBR. Bit rate values can be updated after a start of an MBMS session via an MBMS session update request, for example, based on content from a content source/encoder.

At step 1304, the MCE allocates network resources based on MBR and GBR. As such, the network resource allocation will be used by all eNBs in an MBSFN area in order to receive data from the BM-SC through the MBMS-GW, and via a SYNC protocol, for example.

At step 1306, the MCE informs all the eNBs in the MBSFN area of the network resource allocation. Upon receiving the resource allocation, the eNBs know at what bit rate data from the BM-SC will be received, and may subsequently begin to receive data at the bit rate.

At step 1308, the MCE determines an amount of available network resources for adjusting a network resource allocation of a session. For example, the MCE may determine the amount of available resources by receiving from at least one eNB in the MBSFN area status information indicating a change in an amount of data being received by the at least one eNB via the allocated network resources.

At step 1310, the MCE determines an adjusted bit rate for transmitting data based on the adjusted network resource allocation. For example, the MCE adjusts the bit rate by allocating more network resources to a higher priority session up to MBR if the amount of available network resources exceeds a threshold. Here, the threshold may be exceeded when the resources allocated for MBMS services is close to being exhausted. For example, if a system allocates 25% of an entire bandwidth to MBMS sessions, the threshold can be set to 20% of the entire bandwidth. Accordingly, if the threshold (e.g. 20% of the entire bandwidth) is exceeded, and the rest of the resources are not sufficient to admit another MBMS session, the MCE can allocate more resources to higher priority sessions up to MBR. In another example, the MCE may adjust the bit rate by allocating less network resources to a lower priority session down to GBR if the amount of available network resources is below a threshold. For example, if the system allocates 25% of the entire bandwidth to MBMS sessions, the threshold can be set to 20% of the entire bandwidth. Accordingly, if the amount of available resources is less than the threshold, and an additional MBMS session is requested to be added, but the rest of the resources is not sufficient to admit the additional MBMS session, the MCE can allocate less resources to lower priority sessions down to GBR so that the additional MBMS session can be added.

At step 1312, the BM-SC and all eNBs are informed of the adjusted bit rate. Accordingly, the BM-SC may begin sending data at the adjusted bit rate. Here, informing the BM-SC of the adjusted bit rate may also be referred to as the rate adaptation request since the MCE provides the adjusted bit rate to the BM-SC for the purpose of modifying a current bit rate at which data is communicated. Notably, a message type for informing the BM-SC of the adjusted bit rate is dependent on a transport protocol (e.g., DASH or RTP) between the BM-SC and a content source.

Figure 14:
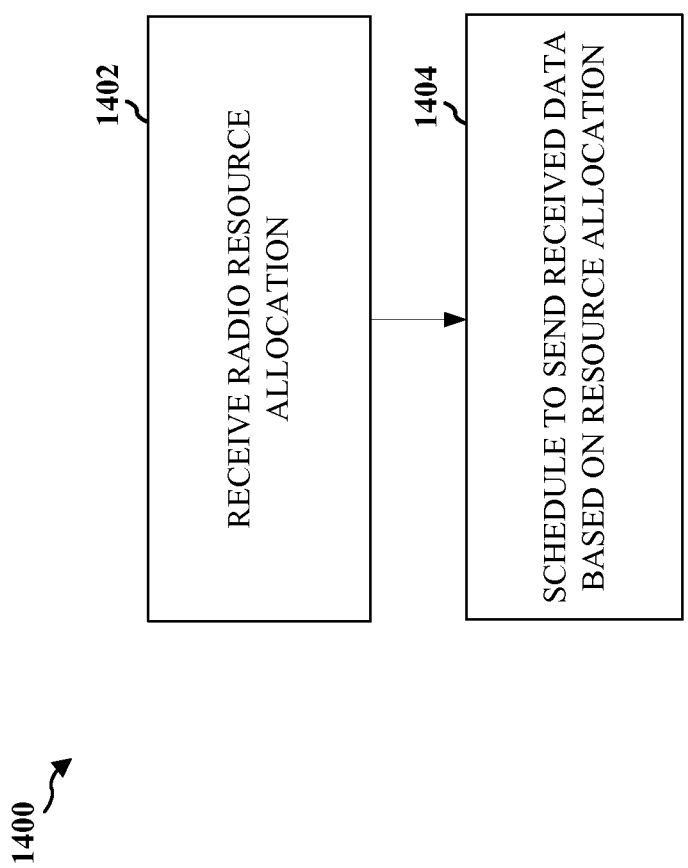
FIG. 14 is a flow chart of a method of wireless communication.

FIG. 14 is a flow chart 1400 of a method of wireless communication for allocating network resources based on a bit rate. The method may be performed by an eNB.

At step 1402, the eNB receives a network resource allocation from an MCE. The network resource allocation is based on at least one bit rate received from a BM-SC. Particularly, the at least one bit rate is MBR, and the MBR is equal GBR. Moreover, the at least one bit rate can be updated after a start of an MBMS session via an MBMS session update request, for example, based on content from a content source/encoder.

At step 1404, the eNB schedules to send received MBMS data based on the network resource allocation if the MBMS data is received by the eNB for transmission in a particular subframe. Notably, the network resource allocation may be allocated to unicast data when all of the network resource allocation is not used to send the MBMS.

Figure 15:
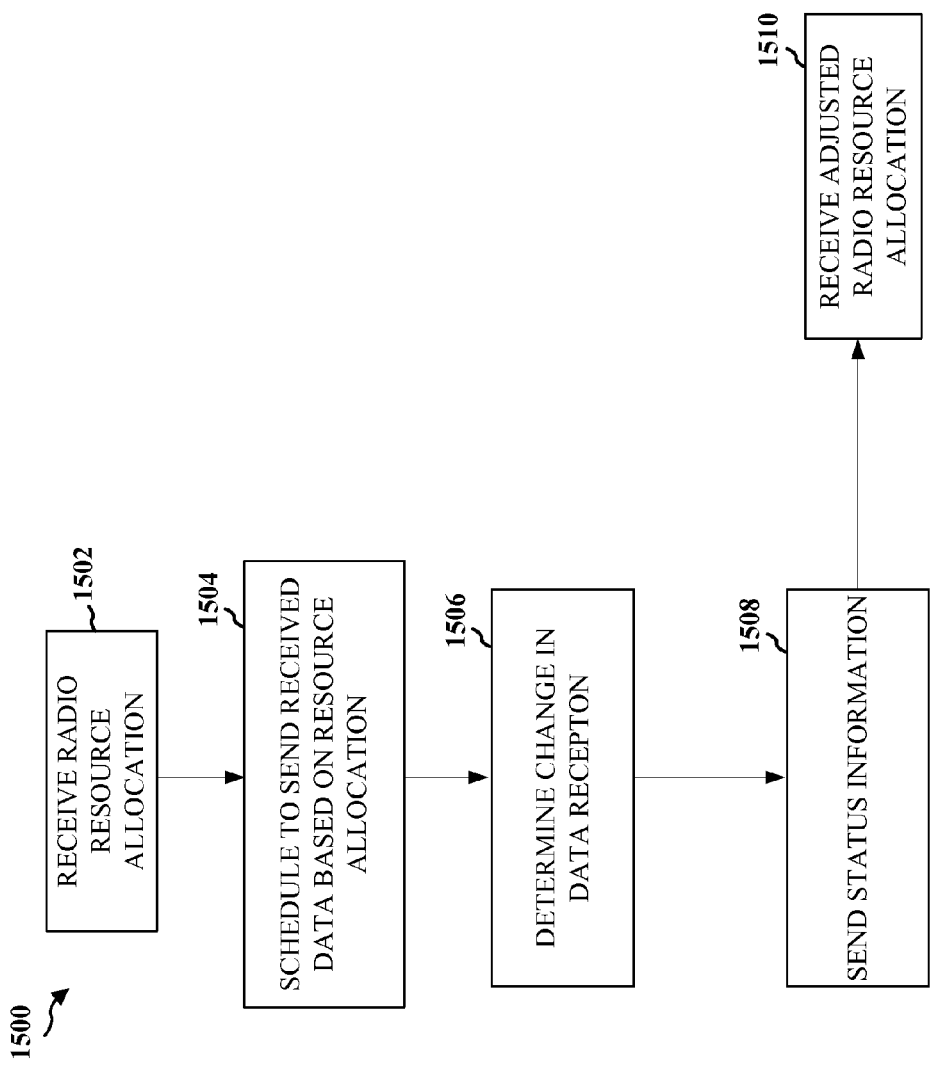
FIG. 15 is a flow chart of a method of wireless communication.

FIG. 15 is a flow chart 1500 of a method of wireless communication for adjusting a network resource allocation. The method may be performed by an eNB.

At step 1502, the eNB receives a network resource allocation from an MCE. The network resource allocation is based on two bit rates received from a BM-SC. Particularly, the two bit rates are MBR and GBR. Bit rates can be updated after a start of an MBMS session via an MBMS session update request, for example, based on content from a content source/encoder.

At step 1504, the eNB schedules to send received MBMS data based on the network resource allocation if the MBMS data is received by the eNB for transmission in a particular subframe. Notably, the network resource allocation may be allocated to unicast data when all of the network resource allocation is not used to send the MBMS data.

At step 1506, the eNB determines a change in an amount of data being received via the network resource allocation. For example, the change in data reception may occur when the eNB experiences lighter or heavier traffic, thus less or more data being received.

At step 1508, the eNB sends to the MCE status information indicating the change in the amount of data being received. Here, the status information may also be referred to as the rate adaptation request since the eNB provides the status information to the MCE for the purpose of modifying a current bit rate at which data is received.

At step 1510, the eNB receives from the MCE an adjusted network resource allocation based on the transmitted status information. For example, if the status information indicates a reduced amount of data being received by the eNB, the adjusted network resource allocation indicates a reduced amount of allocated network resources for an MBMS session down to GBR. In another example, if the status information indicates an increased amount of data being received by the eNB, the adjusted network resource allocation indicates an increased amount of allocated network resources for an MBMS session up to MBR.

Figure 16:
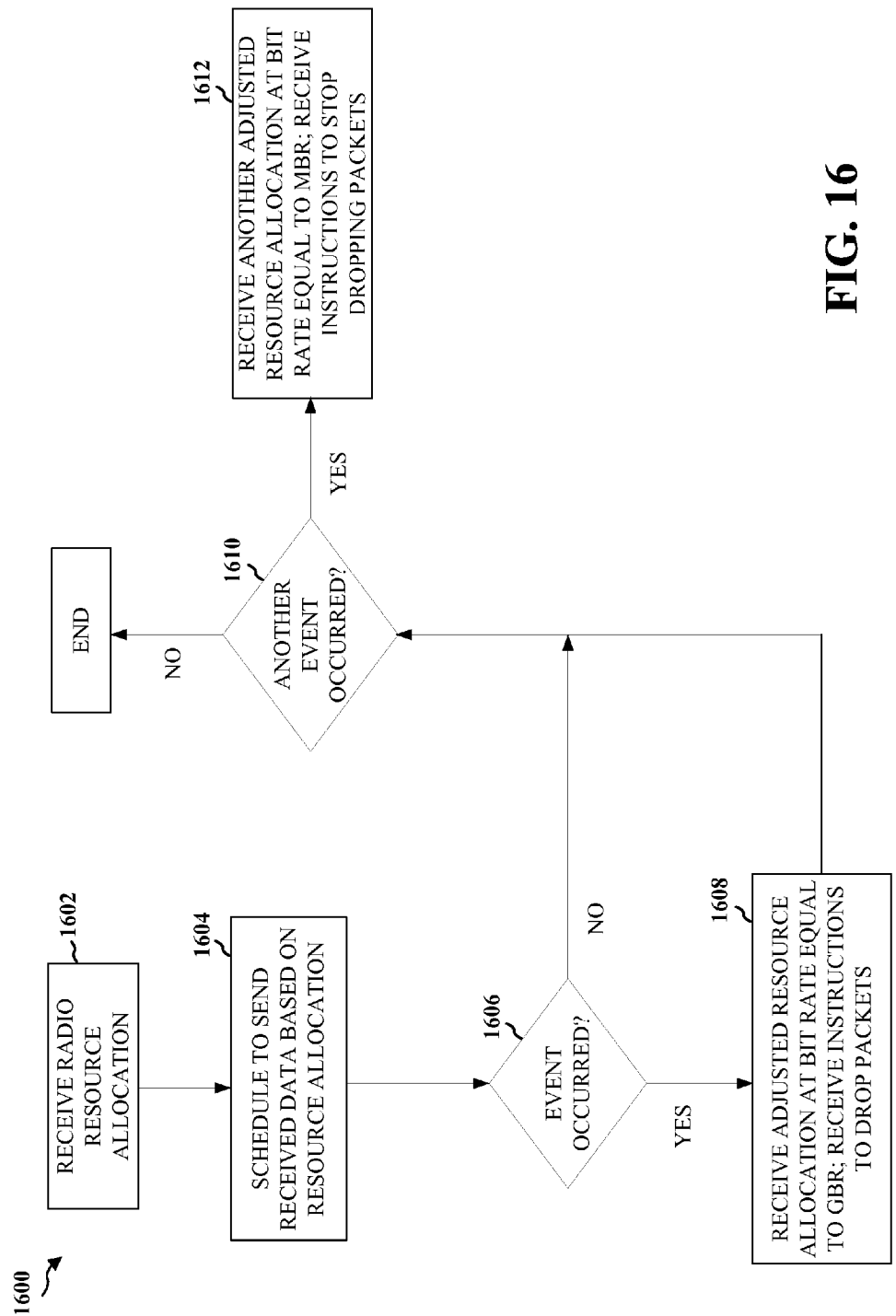
FIG. 16 is a flow chart of a method of wireless communication.

FIG. 16 is a flow chart 1600 of a method of wireless communication for adjusting a network resource allocation. The method may be performed by an eNB.

At step 1602, the eNB receives a network resource allocation from an MCE. The network resource allocation is based on two bit rates received from a BM-SC. Particularly, the two bit rates are MBR and GBR, and network resources are allocated at a bit rate greater than GBR. Bit rates can be updated after a start of an MBMS session via an MBMS session update request, for example, based on content from a content source/encoder.

At step 1604, the eNB schedules to send received MBMS data based on the network resource allocation if the MBMS data is received by the eNB for transmission in a particular subframe. Notably, the network resource allocation may be allocated to send unicast data when all of the network resource allocation is not used to send the MBMS data.

At step 1606, the eNB determines whether a particular event occurs. Based on the occurrence of the event, a current bit rate adjustment may be requested or signaled. For example, if the eNB transmits to the MCE information indicating an unavailability of network resources to maintain the current bit rate, then the current bit rate may be adjusted in order for the eNB to meet GBR. In another example, the MCE may determine to allow a new session to be scheduled. Accordingly, because resources would need to be allocated for the new session, the current bit rate is adjusted for an existing session in order to free up resources for the new session.

At step 1608, if the event occurs (e.g., eNB indicates no resources available to maintain current bit rate, or MCE decides to admit new session), then the eNB receives an adjusted network resource allocation at a bit rate equal to GBR in order to maintain the guaranteed bit rate specified by the BM-SC. Moreover, the eNB may receive instructions from the MCE to drop data packets according to a predetermined packet dropping rule when the available network resources cannot meet GBR.

At step 1610, the MCE determines whether another event occurs. Based on the occurrence of another event, the current bit rate may be adjusted. For example, if the eNB indicates an availability of network resources to meet MBR, then the current bit rate may be adjusted in order for the eNB to send a more robust signal.

At step 1612, if the other event occurs (e.g., eNB indicates resources available to meet MBR), then the eNB receives another adjusted network resource allocation sufficient to send at a bit rate equal to MBR, the maximum allowed by the BM-SC. Moreover, the eNB may receive instructions from the MCE to cease packet dropping upon the occurrence of the other event.

Figure 17:
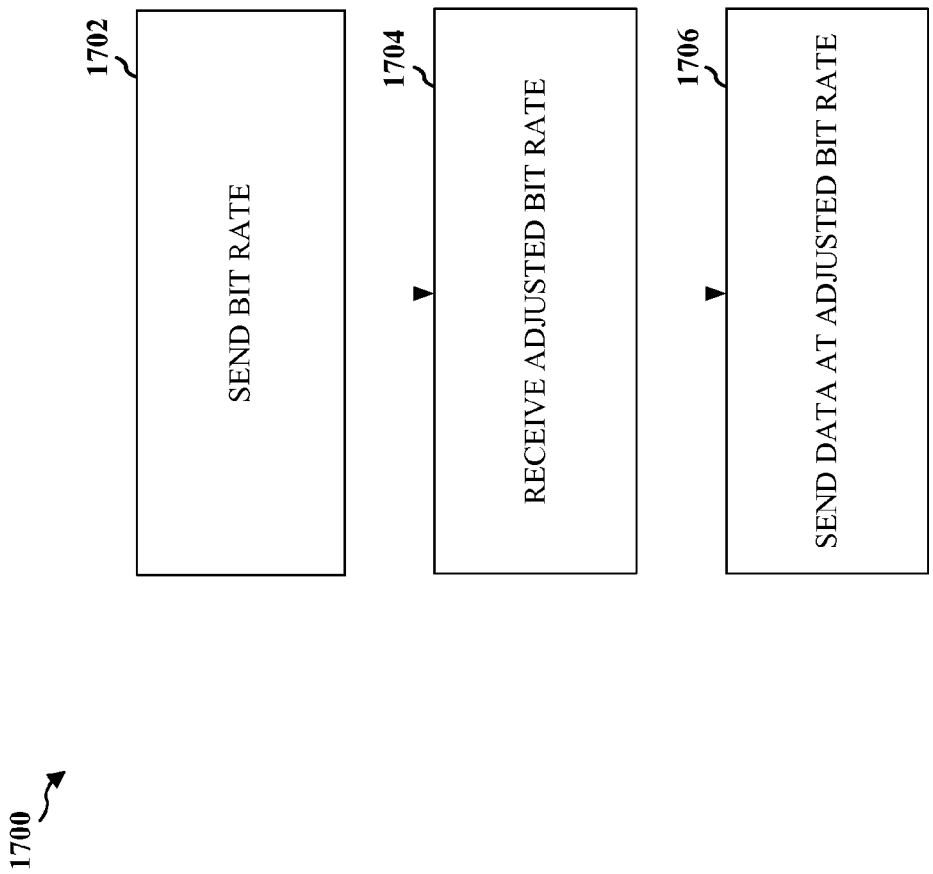
FIG. 17 is a flow chart of a method of wireless communication.

FIG. 17 is a flow chart 1700 of a method of wireless communication for adjusting a network resource allocation. The method may be performed by a BM-SC.

At step 1702, the BM-SC sends to the MCE at least one bit rate for allocating network resources of a session. Particularly, the at least one bit rate is MBR and GBR. Moreover, the at least one bit rate can be updated after a start of an MBMS session via an MBMS session update request, for example, based on content from a content source/encoder.

At step 1704, the BM-SC receives an adjusted bit rate from the MCE. The adjusted bit rate is for transmitting data based on an adjusted network resource allocation, and is determined by the MCE. The MCE may determine the adjusted network resource allocation based on an amount of available resources for sending data to at least one eNB. Moreover, the MCE may determine the amount of available resources based on status information received from the at least one eNB indicating a change in an amount of data being received by the at least one eNB via the allocated network resources. If the amount of available network resources exceeds a threshold, the adjusted network resource allocation may allocate more network resources to a higher priority session up to MBR. If the amount of available network resources is less than a threshold, the adjusted network resource allocation may allocate less network resources to a lower priority session down to GBR if the amount of available network resources is less than a threshold.

The BM-SC may consolidate all feedback (i.e., consolidate adjusted bit rates) from all MCEs received within a predetermined duration. Based on the consolidated feedback, the BM-SC may determine a consolidated adjusted bit rate based on a minimum of all the adjusted bit rates received from all of the MCEs. The BM-SC may then send a rate adjustment request to a content source/encoder based on the consolidated adjusted bit rate. In an aspect, the BM-SC may receive from the content source/encoder information indicating the bit rates that the content source/encoder is capable of providing. Accordingly, when sending the rate adjustment request to the content source/encoder, the BM-SC may request a bit rate that is less than or equal to the consolidated adjusted bit rate. Thereafter, the content source/provider may provide data to the BM-SC at the consolidated adjusted bit rate (or maximum bit rate capable of being provided by the content source encoder).

At step 1706, the BM-SC sends data at the consolidated adjusted bit rate. Here, sending data at the consolidated adjusted bit rate may also be referred to as a rate adaptation request acknowledgment since the BM-SC inherently acknowledges a rate adaptation request from MCEs by transmitting data at an adjusted bit rate. Notably, a message type for receiving the adjusted bit rate from the MCE is dependent on a transport protocol (e.g., DASH or RTP) between the BM-SC and a content source.

Figure 18:
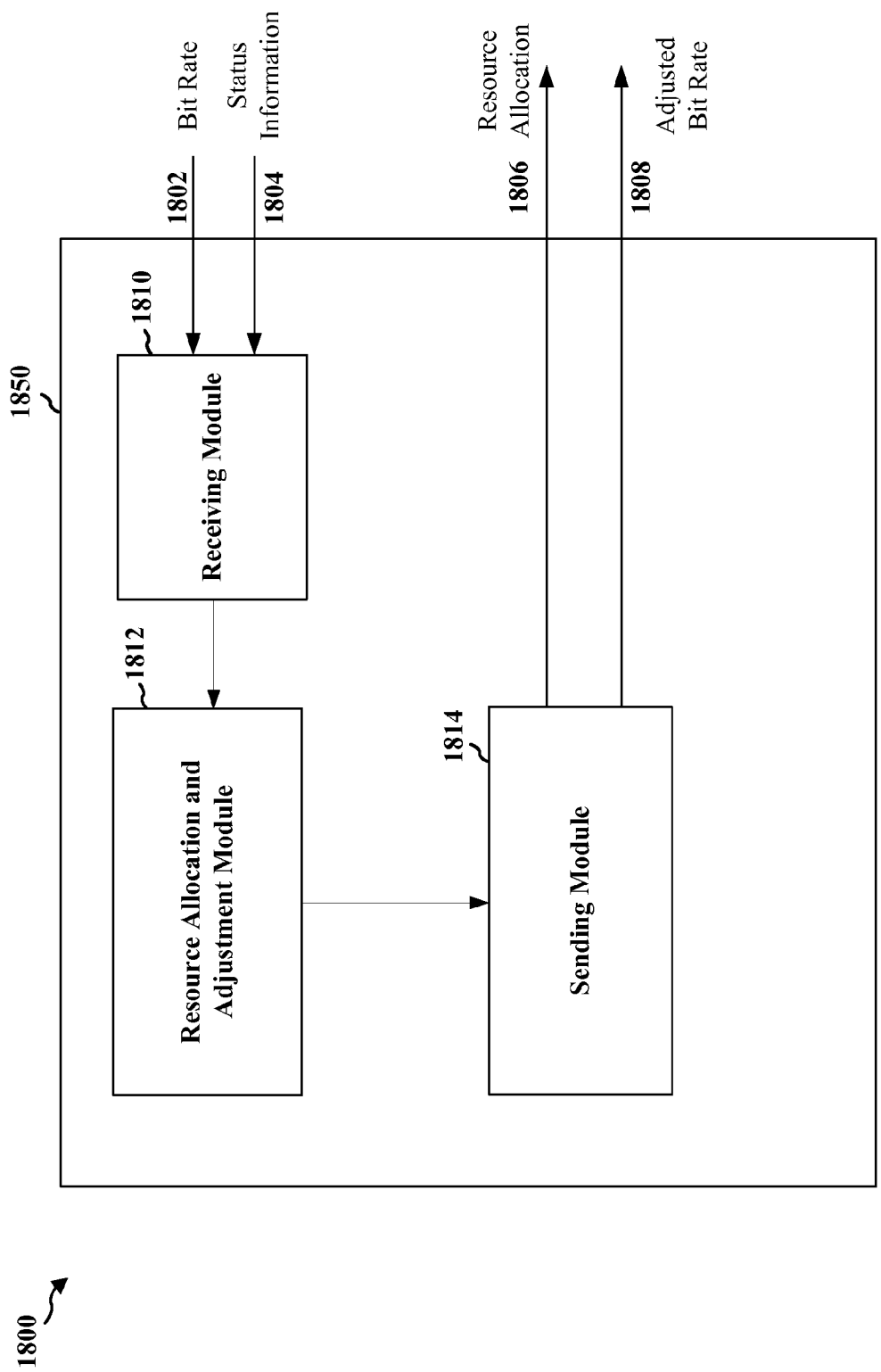
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1850. The apparatus 1850 includes a receiving module 1810 that receives at least one bit rate 1802 from a BM-SC, wherein the least one bit rate is at least one of an MBR or GBR, and wherein the MBR may be equal to the GBR. Also included is a resource allocation and adjustment module 1812 that allocates network resources based on the at least one bit rate, and a sending module 1814 that informs all eNBs in an MBSFN area of the network resource allocation 1806.

In an aspect, the resource allocation and adjustment module 1812 allocates network resources based on a bit rate between MBR and GBR. The receiving module 1810 receives from at least one eNB in the MBSFN area status information indicating a change an amount of data being received by the at least one eNB via the allocated network resources. The resource allocation and adjustment module 1812 also determines whether the received status information indicates that the at least one eNB receives a reduced amount of data or an increased amount of data, and decides whether the current bit rate is to be adjusted. The resource allocation and adjustment module 1812 reduces the amount of allocated network resources down to GBR if the received status information indicates that the at least one eNB transmits a reduced amount of data, and increases the amount of allocated network resources up to MBR if the received status information indicates that the at least one eNB receives an increased amount of data. The sending module 1814 then informs all eNBs in the MBSFN area of the adjusted network resource allocation 1806.

In a further aspect, the resource allocation and adjustment module 1812 allocates network resources based on a bit rate greater than GBR. The resource allocation and adjustment module 1812 further determines an appropriate bit rate and allocates necessary resources to eNBs to transmit at the appropriate bit rate based on a condition (e.g., event occurrence). Thus, the resource allocation and adjustment module 1812 also determines whether a particular event occurs. Based on the occurrence of the event, the resource allocation and adjustment module 1812 determines whether the current bit rate is to be adjusted. If the event occurs (e.g., eNB indicates no resources available to maintain current bit rate, or MCE decides to admit new session), then the resource allocation and adjustment module 1812 adjusts the current bit rate down to GBR. Moreover, the resource allocation and adjustment module 1812 may instruct the at least one eNB to drop data packets via the sending module 1814 according to a predetermined packet dropping rule when the available network resources cannot meet GBR. The resource allocation and adjustment module 1812 further determines whether another event occurs. Based on the occurrence of another event, the resource allocation and adjustment module 1812 determines whether the current bit rate is to be adjusted again. If the other event occurs (e.g., all eNBs indicate resources available to meet MBR), then the resource allocation and adjustment module 1812 adjusts the current bit rate up to MBR. Moreover, the MCE may instruct the eNBs via the sending module 1814 to cease packet dropping upon the occurrence of the other event. The sending module 1814 also informs all eNBs in the MBSFN area of the adjusted bit rate. Notably, all eNBs in the MBSFN area behave in the same way with respect to packet dropping. Thus, packet dropping is not determined by an eNB on an individual basis.

In another aspect, the resource allocation and adjustment module 1812 determines an amount of available network resources for adjusting a network resource allocation of a session. The resource allocation and adjustment module 1812 may determine the amount of available resources by receiving from at least one eNB in the MBSFN area via the receiving module 1810 status information 1804 indicating a change in an amount of data being received by the at least one eNB via the allocated network resources. The resource allocation and adjustment module 1812 determines an adjusted bit rate for transmitting data based on the adjusted network resource allocation. The resource allocation and adjustment module 1812 adjusts the bit rate by allocating more network resources to a higher priority session up to MBR if the amount of available network resources exceeds a threshold. Also, the resource allocation and adjustment module 1812 adjusts the bit rate by allocating less network resources to a lower priority session down to GBR if the amount of available network resources is below a threshold. The transmission module 1814 informs the BM-SC and all eNBs of the adjusted bit rate 1808.

Figure 19:
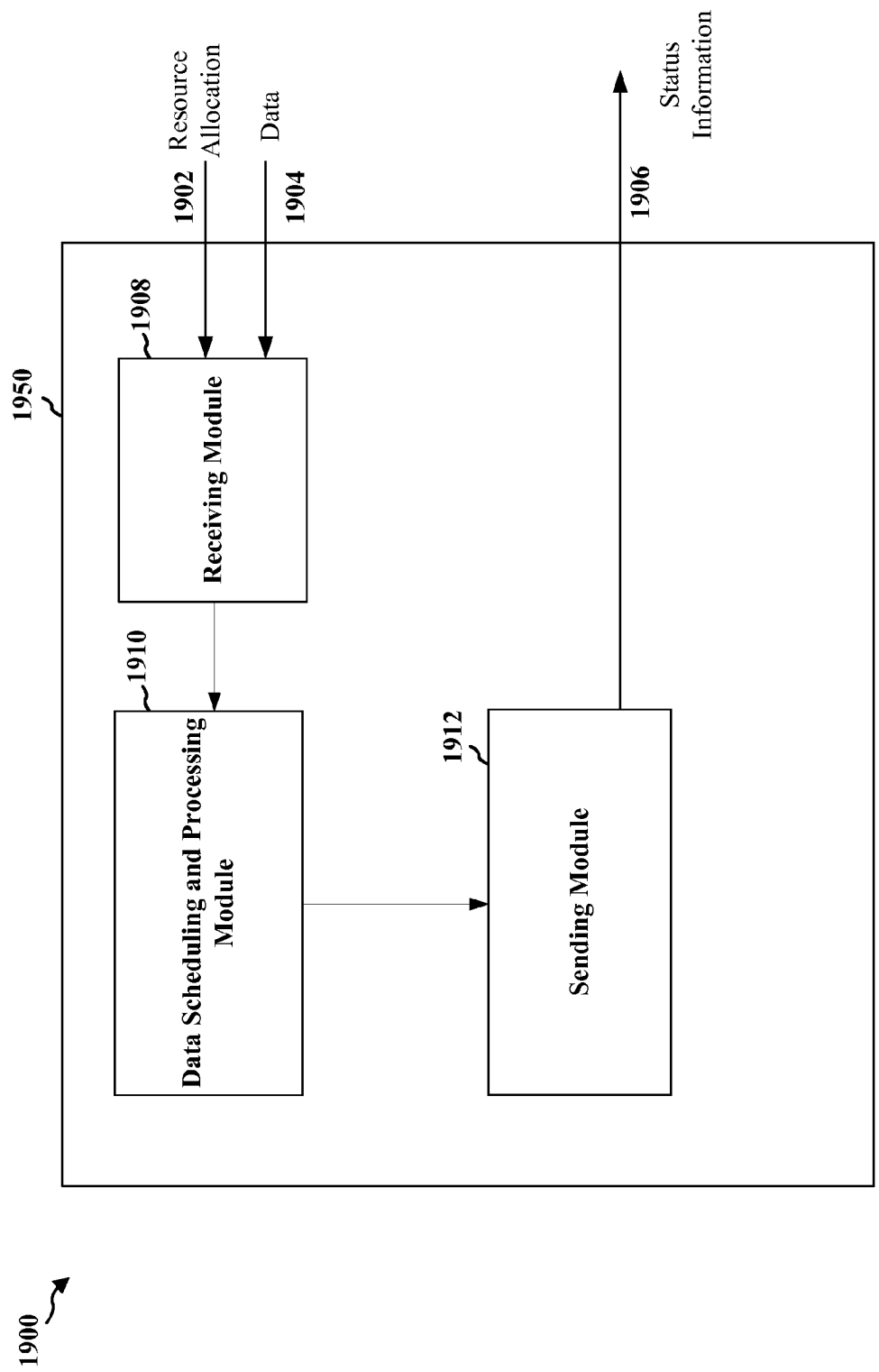
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1950. The apparatus 1950 includes a receiving module 1908 that receives a network resource allocation 1902 from an MCE. The network resource allocation 1902 is based on at least one bit rate, wherein the least one bit rate is at least one of an MBR or GBR, and wherein the MBR may be equal to the GBR. The data scheduling and processing module 1910 schedules to send received MBMS data 1904 based on the network resource allocation 1902 if the MBMS data 1904 is received for transmission in a particular subframe. The data scheduling and processing module 1910 may allocate the network resource allocation to unicast data when all of the network resource allocation is not used to send the MBMS data.

In an aspect, the data scheduling and processing module 1910 determines a change in an amount of data being received via the network resource allocation, such as when the apparatus 1950 experiences lighter or heavier traffic. The data scheduling and processing module 1910 sends to the MCE via the sending module 1912 status information 1906 indicating the change in the amount of data being received. The receiving module 1908 receives from the MCE an adjusted network resource allocation 1902 based on the transmitted status information 1906. If the status information indicates a reduced amount of data being received by the apparatus 1950, the adjusted network resource allocation indicates a reduced amount of allocated network resources down to GBR. If the status information indicates a reduced amount of data being received by the apparatus 1950, the adjusted network resource allocation indicates an increased amount of allocated network resources up to MBR.

In a further aspect, the data scheduling and processing module 1910 determines whether a particular event occurs. Based on the occurrence of the event, a current bit rate may be adjusted. If the event occurs (e.g., apparatus 1950 indicates no resources available to maintain current bit rate, or MCE decides to admit new session), then the receiving module 1908 receives an adjusted network resource allocation at a bit rate equal to GBR. Moreover, the receiving module 1908 may receive instructions from the MCE to drop data packets according to a predetermined packet dropping rule when the available network resources cannot meet GBR. The data scheduling and processing module 1910 also determines whether another event occurs. Based on the occurrence of another event, the current bit rate may be adjusted again. If the other event occurs (e.g., apparatus 1950 indicates resources available to meet MBR), then the receiving module 1908 receives another adjusted network resource allocation at a bit rate equal to MBR. Moreover, the receiving module 1908 may receive instructions from the MCE to cease packet dropping upon the occurrence of the other event.

Figure 20:
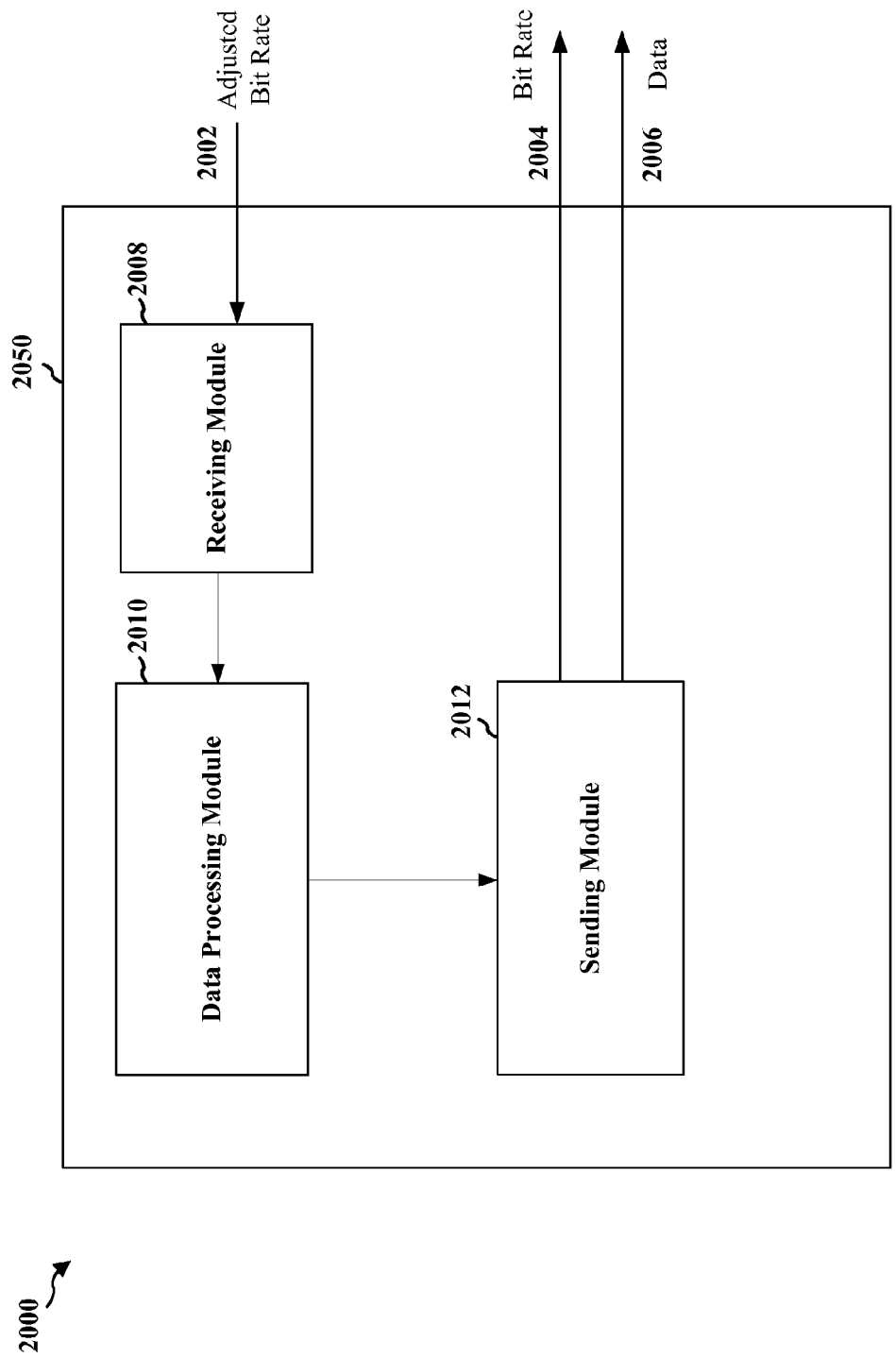
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2050. The apparatus 2050 includes a data processing module 2010 that sends to an MCE via a sending module 2012 at least one bit rate 2004 for allocating network resources of a session, wherein the least one bit rate is at least one of an MBR or GBR, and wherein the MBR may be equal to the GBR. The data processing module 2010 receives via a receiving module 2008 an adjusted bit rate from the MCE. The adjusted bit rate is for transmitting data based on an adjusted network resource allocation, and is determined by the MCE. The MCE may determine the adjusted network resource allocation based on an amount of available resources for transmitting data to at least one eNB. Moreover, the MCE may determine the amount of available resources based on status information received from the at least one eNB indicating a change in an amount of data being received by the at least one eNB via the allocated network resources. If the amount of available network resources exceeds a threshold, the adjusted network resource allocation may allocate more network resources to a higher priority session, e.g., up to MBR. If the amount of available network resources is less than a threshold, the adjusted network resource allocation may allocate less network resources to a lower priority session, e.g., down to GBR if the amount of available network resources is less than a threshold.

The data processing module 2010 may consolidate all feedback (i.e., consolidate adjusted bit rates) from all MCEs received within a predetermined duration. Based on the consolidated feedback, the data processing module 2010 may determine a consolidated adjusted bit rate based on a minimum of all the adjusted bit rates received from all of the MCEs. The data processing module 2010 may then send a rate adjustment request to a content source/encoder based on the consolidated adjusted bit rate. In an aspect, the data processing module 2010 may receive from the content source/encoder information indicating the bit rates that the content source/encoder is capable of providing. Accordingly, when sending the rate adjustment request to the content source/encoder, the data processing module 2010 may request a bit rate that is less than or equal to the consolidated adjusted bit rate. Thereafter, the content source provides data to the data processing module 2010 at the consolidated adjusted bit rate (or maximum bit rate capable of being provided by the content source/encoder). Upon recognizing the data provided by the content source/encoder at the consolidated adjusted bit rate, the data processing module 2010 sends data 2006 at the consolidated adjusted bit rate via the sending module 2012.

The apparatus may include additional modules that perform each of the steps of the algorithm in the aforementioned flow charts FIGS. 10-17. As such, each step in the aforementioned flow charts FIGS. 10-17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
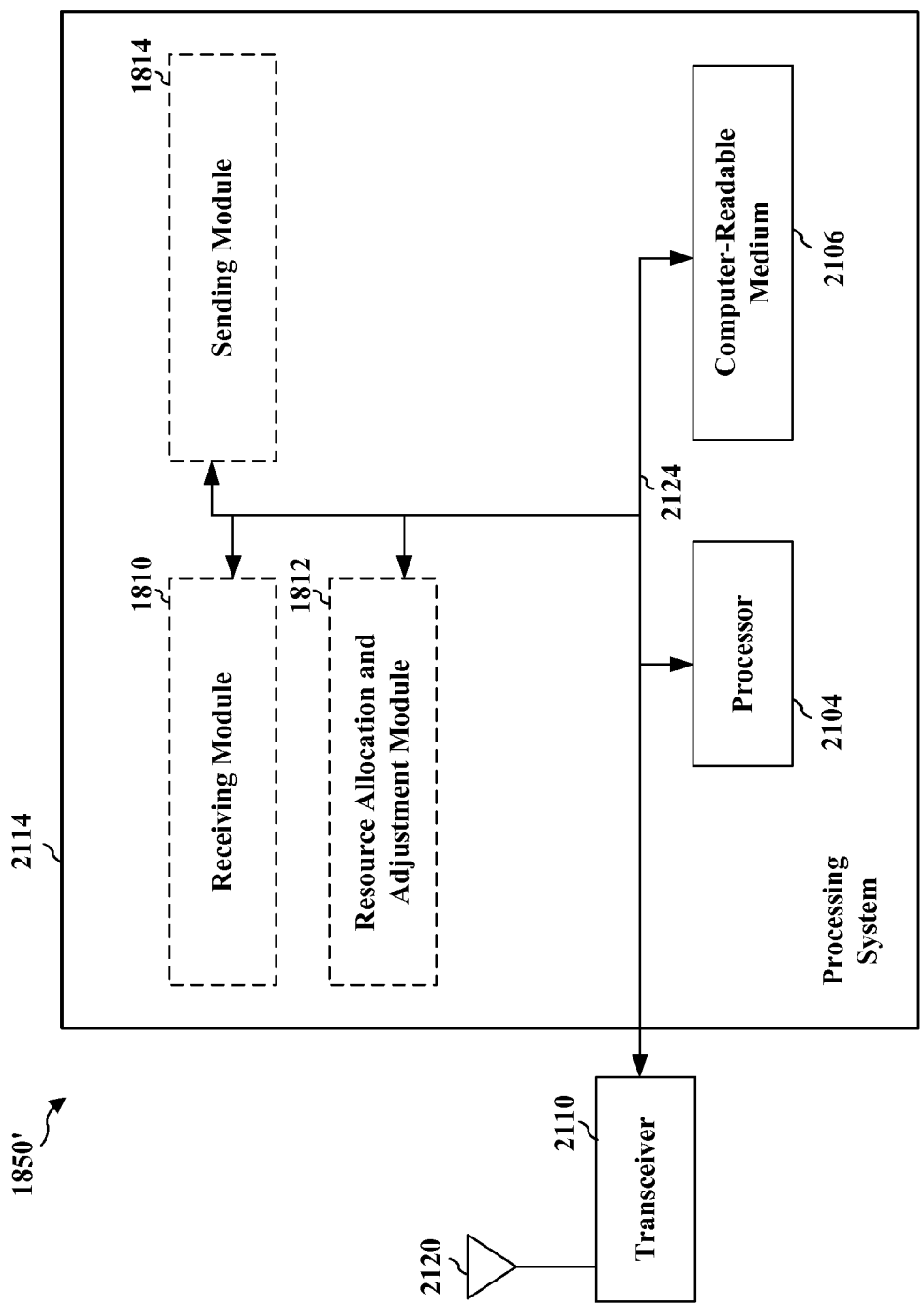
FIG. 21 is a diagram illustrating an example of a hardware implementation for an apparatus employing a processing system.

FIG. 21 is a diagram illustrating an example of a hardware implementation for an apparatus 1850' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 1810, 1812, 1814, and the computer-readable medium 2106. The bus 2124 may also link various other circuits such as timing sources, peripherals, voltage regulators, and power management circuits, which are well known in the art, and therefore, will not be described any further.

The apparatus includes a processing system 2114 coupled to a transceiver 2110. The transceiver 2110 is coupled to one or more antennas 2120. The transceiver 2110 provides a means for communicating with various other apparatus over a transmission medium. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes modules 1810, 1812, and 1814. The modules may be software modules running in the processor 2104, resident/stored in the computer readable medium 2106, one or more hardware modules coupled to the processor 2104, or some combination thereof.

In one configuration, the apparatus 1850/1850' for wireless communication includes means for receiving from at least one eNB in the broadcast/multicast area status information indicating a change in an amount of data being received by the at least one eNB via the allocated network resources, means for adjusting the network resource allocation based on the received status information, wherein the at least one bit rate comprises a guaranteed bit rate (GBR), means for reducing an amount of the allocated network resources based on the GBR when the status information indicates a reduced amount of data being received by the at least one eNB, and wherein the at least one bit rate comprises a maximum bit rate (MBR), means for increasing an amount of the allocated network resources based on the MBR when the status information indicates an increased amount of data being received by the at least one eNB.

In another configuration, the apparatus 1850/1850' for wireless communication includes means for allocating the network resources for a session based on a first bit rate, the first bit rate greater than GBR, means for adjusting the network resource allocation to a second bit rate based on the occurrence of an event, the second bit rate equal to GBR, means for instructing at least one eNB to drop data packets according to a predetermined packet dropping rule when the available network resources cannot meet GBR, means for adjusting the network resource allocation to a third bit rate based on the occurrence of another event, the third bit rate equal to MBR, and means for instructing the at least one eNB to stop dropping data packets upon the occurrence of the another event.

In a further configuration, the apparatus 1850/1850' for wireless communication includes means for determining an amount of available network resources for adjusting a network resource allocation of a session, means for determining an adjusted bit rate for transmitting data based on the adjusted network resource allocation, means for informing the BM-SC and all eNBs of the adjusted bit rate, means for receiving from at least one eNB in the broadcast/multicast area status information indicating a change in an amount of data being received by the at least one eNB via the allocated network resources, means for allocating more network resources to a higher priority session based on MBR if an amount of available network resources exceed a threshold, and means for allocating less network resources to a lower priority session based on GBR if an amount of available network resources are below a threshold.

Figure 22:
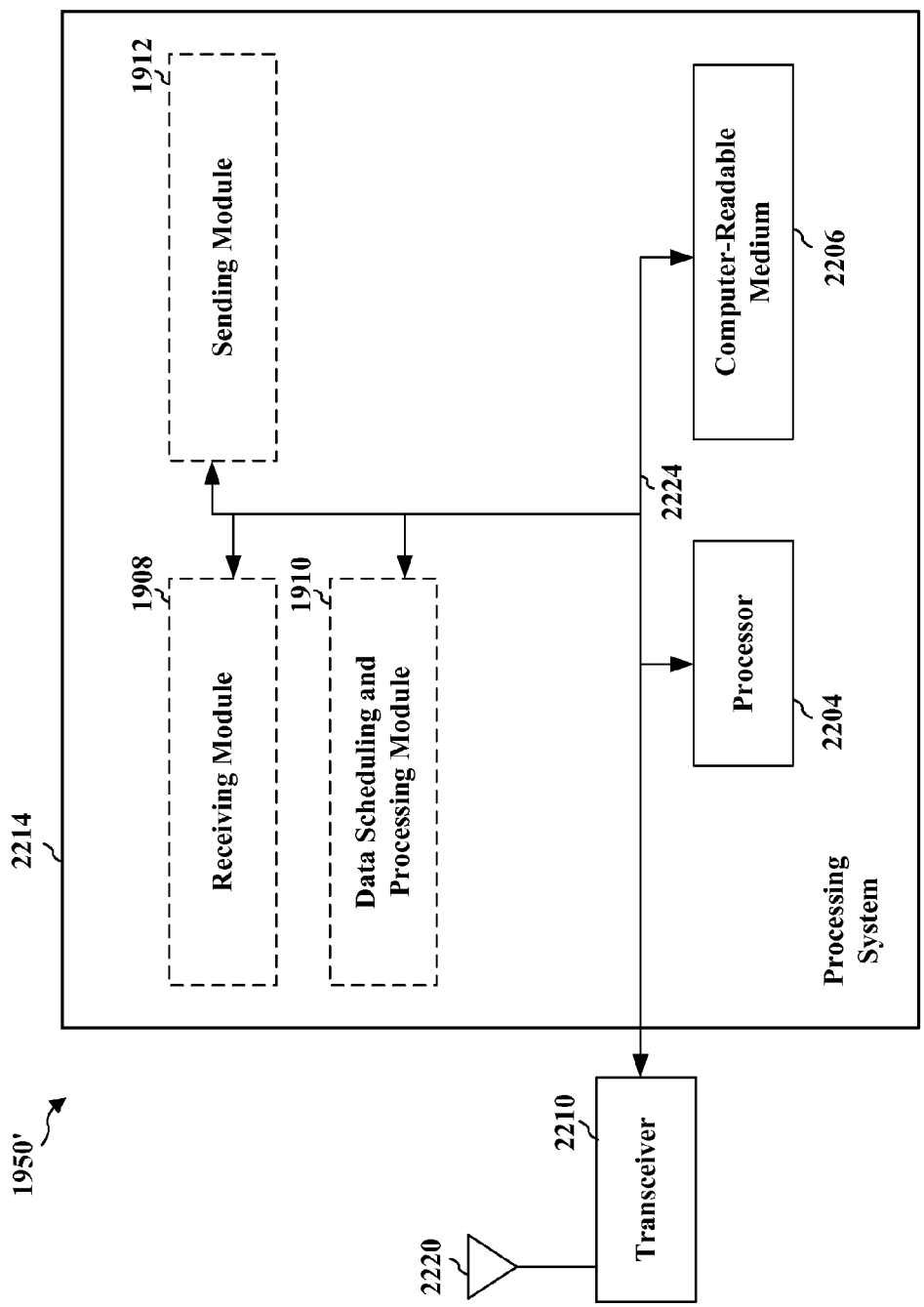
FIG. 22 is a diagram illustrating an example of a hardware implementation for an apparatus employing a processing system.

FIG. 22 is a diagram illustrating an example of a hardware implementation for an apparatus 1950' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 1908, 1910, 1912, and the computer-readable medium 2206. The bus 2224 may also link various other circuits such as timing sources, peripherals, voltage regulators, and power management circuits, which are well known in the art, and therefore, will not be described any further.

The apparatus includes a processing system 2214 coupled to a transceiver 2210. The transceiver 2210 is coupled to one or more antennas 2220. The transceiver 2210 provides a means for communicating with various other apparatus over a transmission medium. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes modules 1908, 1910, and 1912. The modules may be software modules running in the processor 2204, resident/stored in the computer readable medium 2206, one or more hardware modules coupled to the processor 2204, or some combination thereof.

The processing system 2214 may be a component of the eNB 610 and may include the memory 676 and/or at least one of the TX processor 616, the RX processor 670, and the controller/processor 675.

In one configuration, the apparatus 1950/1950' for wireless communication includes means for receiving a network resource allocation from a multi-cell/multicast coordination entity (MCE), the network resource allocation based on at least one bit rate received from a broadcast-multicast service center (BM-SC), means for scheduling to send received broadcast/multicast data based on the network resource allocation, and means for using the network resource allocation to send unicast data when all of the network resource allocation is not used to send the broadcast/multicast data.

In another configuration, the apparatus 1950/1950' for wireless communication includes means for determining a change in an amount of data being received via the network resource allocation, means for transmitting to the MCE status information indicating the change in the amount of data being received, and means for receiving from the MCE an adjusted network resource allocation based on the transmitted status information.

In a further configuration, the apparatus 1950/1950' for wireless communication includes, wherein the at least one bit rate comprises a guaranteed bit rate (GBR), means for scheduling to receive broadcast/multicast data based on the network resource allocation at a first bit rate, the first bit rate greater than GBR, means for receiving from the MCE an adjusted network resource allocation to a second bit rate based on the occurrence of an event, the second bit rate equal to GBR, means for receiving instructions from the MCE to drop data packets according to a predetermined packet dropping rule when the available network resources cannot meet GBR, wherein the at least one bit rate further comprises a maximum bit rate (MBR), means for receiving from the MCE another adjusted network resource allocation to a third bit rate based on the occurrence of another event, the third bit rate equal to MBR, and means for receiving instructions from the MCE to stop dropping data packets upon the occurrence of the another event.

The aforementioned means may be one or more of the aforementioned modules of the apparatus 1950 and/or the processing system 2214 of the apparatus 1950' configured to perform the functions recited by the aforementioned means. As described supra, the processing system 2214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 23:
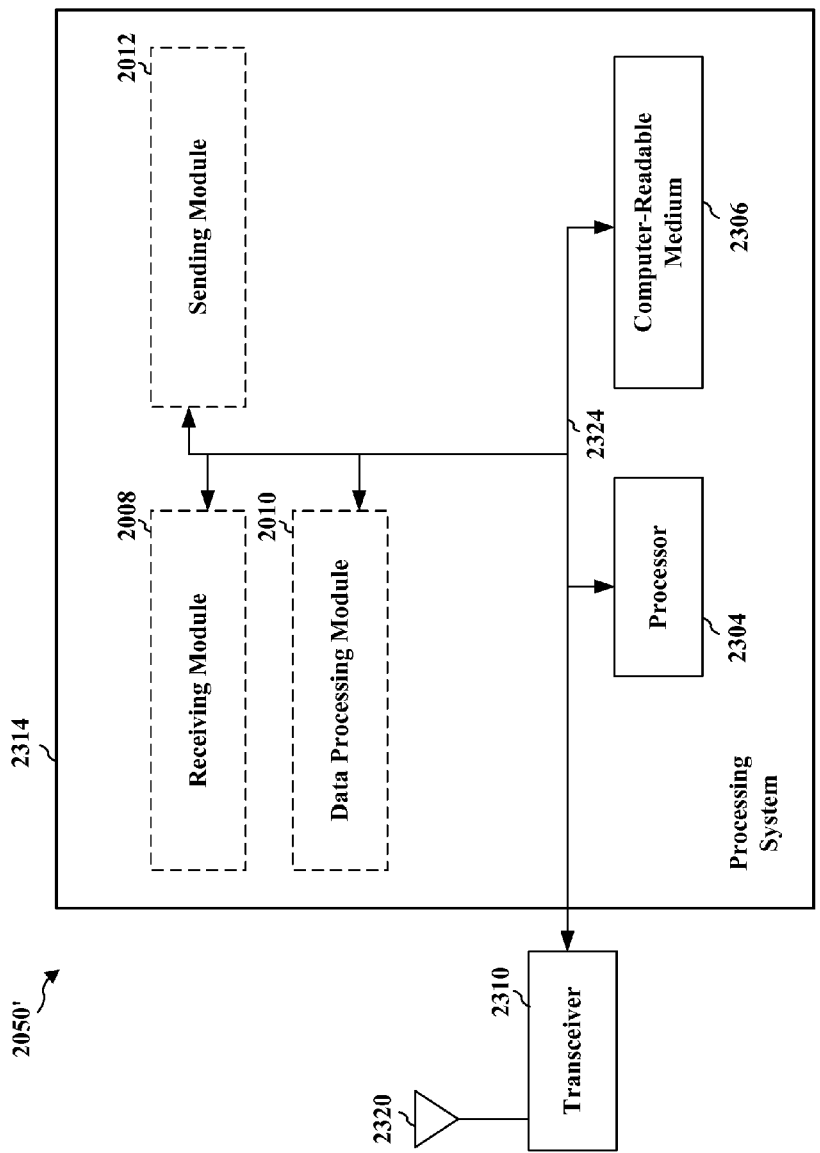
FIG. 23 is a diagram illustrating an example of a hardware implementation for an apparatus employing a processing system.

FIG. 23 is a diagram illustrating an example of a hardware implementation for an apparatus 2050' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2008, 2010, 2012, and the computer-readable medium 2306. The bus 2324 may also link various other circuits such as timing sources, peripherals, voltage regulators, and power management circuits, which are well known in the art, and therefore, will not be described any further.

The apparatus includes a processing system 2314 coupled to a transceiver 2310. The transceiver 2310 is coupled to one or more antennas 2320. The transceiver 2310 provides a means for communicating with various other apparatus over a transmission medium. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes modules 2008, 2010, and 2012. The modules may be software modules running in the processor 2304, resident/stored in the computer readable medium 2306, one or more hardware modules coupled to the processor 2304, or some combination thereof.

In one configuration, the apparatus 2050/2050' for wireless communication includes means for transmitting at least one bit rate for allocating network resources of a session to a multi-cell/multicast coordination entity (MCE), means for receiving an adjusted bit rate from the MCE, the adjusted bit rate for transmitting data based on an adjusted network resource allocation determined by the MCE, and means for transmitting data based on the adjusted bit rate.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method of wireless communication, comprising:
   receiving at least one bit rate for allocating network resources from a network service center;
   allocating the network resources based on the at least one bit rate;

informing all base stations in a broadcast/multicast area of the network resource allocation;

receiving from at least one base station in the broadcast/multicast area status information indicating one or more of a change in an amount of MBMS data being received by the at least one base station via the allocated network resources or a change in a unicast load; and adjusting the network resource allocation based on the received status information, wherein the at least one bit rate comprises a maximum bit rate (MBR) and a guaranteed bit rate (GBR), the method further comprising:

determining an amount of available network resources for adjusting a network resource allocation of a session;

determining an adjusted bit rate for transmitting data based on the adjusted network resource allocation; and informing the network service center and all base stations of the adjusted bit rate.

2. The method of claim 1, wherein the at least one bit rate can be updated after a start of a broadcast/multicast session.

3. The method of claim 1, wherein the MBR is equal to a guaranteed bit rate (GBR).

4. The method of claim 3, wherein the network resources are used for a unicast mode when the network resources are not used for a broadcast/multicast mode.

5. The method of claim 1, wherein the adjusting the network resource allocation comprises reducing an amount of the allocated network resources based on the GBR when the status information indicates one or more of a reduced amount of data being received by the at least one base station or an increased amount of unicast load.

6. The method of claim 1, wherein the adjusting the network resource allocation comprises increasing an amount of the allocated network resources based on the MBR when the status information indicates one or more of an increased amount of data being received by the at least one base station or a reduced amount of unicast load.

7. The method of claim 1, wherein the method further comprises:

allocating the network resources for a session based on a first bit rate, the first bit rate greater than GBR; and adjusting the network resource allocation to a second bit rate based on the occurrence of an event, the second bit rate equal to GBR.

8. The method of claim 7, wherein the event occurs upon receiving from at least one base station in the broadcast/multicast area information indicating an unavailability of network resources to meet the first bit rate.

9. The method of claim 7, wherein the event occurs upon determining to allow a new session to be scheduled.

10. The method of claim 7, further comprising instructing at least one base station to drop data packets according to a predetermined packet dropping rule when the available network resources cannot meet the second bit rate.

11. The method of claim 10, wherein the method further comprises:

adjusting the network resource allocation to a third bit rate based on the occurrence of another event, the third bit no greater than MBR; and instructing the at least one base station to stop dropping data packets upon the occurrence of the another event.

12. The method of claim 11, wherein the another event occurs upon receiving from all base stations in the broadcast/multicast area information indicating an availability of network resources to meet the third bit rate.

13. The method of claim 1, wherein the determining the amount of available resources comprises receiving from at least one base station in the broadcast/multicast area status information indicating one or more of a change in an amount of data being received by the at least one base station via the allocated network resources or a change in a unicast load.

14. The method of claim 1, wherein the adjusting the network resource allocation of the session comprises allocating more network resources to a higher priority session based on MBR if an amount of available network resources exceeds a threshold.

15. The method of claim 1, wherein the adjusting the network resource allocation of the session comprises allocating less network resources to a lower priority session based on GBR if an amount of available network resources are below a threshold.

16. The method of claim 1, wherein a message type for informing the network service center of the adjusted bit rate is dependent on a transport protocol between the network service center and a content source.

17. A method of wireless communication, comprising:

receiving a network resource allocation from a network coordination entity, the network resource allocation based on at least one bit rate received from a network service center, wherein the at least one bit rate is higher than a guaranteed bit rate (GBR) and lower than a maximum bit rate (MBR);

scheduling to send received broadcast/multicast data based on the network resource allocation;

determining one or more of a change in an amount of data being received via the network resource allocation or a change in a unicast load;

transmitting to the network coordination entity status information indicating the one or more of the change in the amount of data being received or the change in the unicast load; and receiving from the network coordination entity an adjusted network resource allocation based on the transmitted status information.

18. The method of claim 17, wherein the at least one bit rate can be updated after a start of a broadcast/multicast session.

19. The method of claim 17, further comprising using the network resource allocation to send unicast data when all of the network resource allocation is not used to send the received broadcast/multicast data.

20. The method of claim 17, wherein the adjusted network resource allocation comprises a reduced amount of allocated network resources based on the GBR when the status information indicates one or more of a reduced amount of data being received or an increased amount of unicast load.

21. The method of claim 17, wherein the adjusted network resource allocation comprises an increased amount of allocated network resources based on the MBR when the status information indicates one or more of an increased amount of data being received or a reduced amount of unicast load.

22. The method of claim 17, wherein the method further comprises:

scheduling to send broadcast/multicast data based on the network resource allocation at a first bit rate, the first bit rate greater than GBR; and receiving from the network coordination entity an adjusted network resource allocation to a second bit rate based on the occurrence of an event, the second bit rate equal to GBR.

23. The method of claim 22, wherein the event occurs upon transmitting to the network coordination entity information indicating an unavailability of network resources to meet the first bit rate.

24. The method of claim 22, wherein the event occurs when the network coordination entity determines to allow a new session to be scheduled.

25. The method of claim 22, further comprising receiving instructions from the network coordination entity to drop data packets according to a predetermined packet dropping rule when the available network resources cannot meet the second bit rate.

26. The method of claim 25, the method further comprises:
receiving from the network coordination entity another adjusted network resource allocation to a third bit rate based on the occurrence of another event, the third bit rate no greater than MBR; and
receiving instructions from the network coordination entity to stop dropping data packets upon the occurrence of the another event.

27. The method of claim 26, wherein the another event occurs upon transmitting to the network coordination entity information indicating an availability of network resources to meet the third bit rate.

28. A method of wireless communication, comprising:
transmitting at least one bit rate for allocating network resources of a session to a network coordination entity, wherein the at least one bit rate is higher than a guaranteed bit rate (GBR) and lower than a maximum bit rate (MBR);
receiving an adjusted bit rate from the network coordination entity, wherein the adjusted bit rate is based on one or more of a change in an amount of data being received by at least One base station via the allocated network resources or a change in a unicast load; and
transmitting data based on the adjusted bit rate.

29. The method of claim 28, wherein the at least one bit rate can be adjusted after a start of the session, the session being a broadcast/multicast session.

30. The method of claim 28, wherein the network coordination entity determines the adjusted network resource allocation based on an amount of available resources for transmitting data to at least one base station.

31. The method of claim 30, wherein the network coordination entity determines the amount of available resources based on status information received from the at least one base station indicating one or more of a change in an amount of data being received by the at least one base station via the allocated network resources or a change in a unicast load.

32. The method of claim 30, wherein the adjusted network resource allocation allocates more network resources to a higher priority session based on MBR if the amount of available network resources exceeds a threshold.

33. The method of claim 30, wherein the adjusted network resource allocation allocates less network resources to a lower priority session based on GBR if the amount of available network resources is less than a threshold.

34. The method of claim 28, further comprising:
determining a consolidated adjusted bit rate based on a plurality of adjusted bit rates received from a plurality of network coordination entities;
sending a rate adjustment request to a content source based on the consolidated adjusted bit rate; and
receiving content from the content source according to the consolidated adjusted bit rate,
wherein the data transmitted based on the adjusted bit rate is based on the content received from the content source according to the consolidated adjusted bit rate.

35. An apparatus of wireless communication, comprising:
means for receiving at least one bit rate for allocating network resources from a network service center;
means for allocating the network resources based on the at least one bit rate;
means for informing all base stations in a broadcast/multicast area of the network resource allocation;
means for receiving from at least one base station in the broadcast/multicast area status information indicating one or more a change in an amount of data being received by the at least one base station via the allocated network resources or a change in a unicast load; and
means for adjusting the network resource allocation based on the received status information,
wherein the at least one bit rate comprises a maximum bit rate (MBR) and a guaranteed bit rate (GBR), the apparatus further comprising:
means for determining an amount of available network resources for adjusting a network resource allocation of a session;
means for determining an adjusted bit rate for transmitting data based on the adjusted network resource allocation; and
means for informing the network service center an all base stations of adjusted bit rate.

36. The apparatus of claim 35, wherein the at least one bit rate can be updated after a start of a broadcast/multicast session.

37. The apparatus of claim 35, wherein the MBR is equal to the GBR.

38. The apparatus of claim 37, wherein the network resources are used for a unicast mode when the network resources are not used for a broadcast/multicast mode.

39. The apparatus of claim 35, wherein the means for adjusting the network resource allocation comprises means for reducing an amount of the allocated network resources based on the GBR when the status information indicates one or more of a reduced amount of data being received by the at least one base station or an increased amount of unicast load.

40. The apparatus of claim 35, wherein the means for adjusting the network resource allocation comprises means for increasing an amount of the allocated network resources based on the MBR when the status information indicates one or more of an increased amount of data being received by the at least one base station or a reduced amount of unicast load.

41. The apparatus of claim 35, further comprising:
means for allocating the network resources for a session based on a first bit rate, the first bit rate greater than GBR; and
means for adjusting the network resource allocation to a second bit rate based on the occurrence of an event, the second bit rate equal to GBR.

42. The apparatus of claim 41, wherein the event occurs when the apparatus receives from at least one base station in the broadcast/multicast area information indicating an unavailability of network resources to meet the first bit rate.

43. The apparatus of claim 41, wherein the event occurs when the apparatus determines to allow a new session to be scheduled.

44. The apparatus of claim 41, further comprising means for instructing at least one base station to drop data packets according to a predetermined packet dropping rule when the available network resources cannot meet the second bit rate.

45. The apparatus of claim 44, further comprising:
means for adjusting the network resource allocation to a third bit rate based on the occurrence of another event, the third bit rate no greater than MBR; and
means for instructing the at least one base station to stop dropping data packets upon the occurrence of the another event.

46. The apparatus of claim 45, wherein the another event comprises receiving from all base stations in the broadcast/multicast area information indicating an availability of network resources to meet the third bit rate.

47. The apparatus of claim 35, wherein the means for determining the amount of available resources comprises means for receiving from at least one base station in the broadcast/multicast area status information indicating one or more of a change in an amount of data being received by the at least one base station via the allocated network resources or a change in a unicast load.

48. The apparatus of claim 35, wherein the means for adjusting the network resource allocation of the session comprises means for allocating more network resources to a higher priority session based on MBR if an amount of available network resources exceeds a threshold.

49. The apparatus of claim 35, wherein the means for adjusting the network resource allocation of the session comprises means for allocating less network resources to a lower priority session based on GBR if an amount of available network resources are below a threshold.

50. The apparatus of claim 35, wherein a message type for informing the network service center of the adjusted bit rate is dependent on a transport protocol between the network service center and a content source.

51. An apparatus of wireless communication, comprising:
means for receiving a network resource allocation from a network coordination entity, the network resource allocation based on at least one bit rate received from a network service center, wherein the at least one bit rate is higher than a guaranteed bit rate (GBR) and lower than a maximum bit rate (MBR);
means for scheduling to send received broadcast/multicast data based on the network resource allocation;
means for determining one or more of a change in an amount of data being received via the network resource allocation or a change in a unicast load;
means for transmitting to the network coordination entity status information indicating one or more of the change in the amount of data being received or the change in the unicast load; and
means for receiving from the network coordination entity an adjusted network resource allocation based on the transmitted status information.

52. The apparatus of claim 51, wherein the at least one bit rate can be updated after a start of a broadcast/multicast session.

53. The apparatus of claim 51, further comprising means for using the network resource allocation to send unicast data when all of the network resource allocation is not used to send the received broadcast/multicast data.

54. The apparatus of claim 51, wherein the adjusted network resource allocation comprises a reduced amount of allocated network resources based on the GBR when the status information indicates one or more of a reduced amount of data being received or an increased amount of unicast load.

55. The apparatus of claim 51, wherein the adjusted network resource allocation comprises an increased amount of allocated network resources based on the MBR when the status information indicates one or more of an increased amount of data being received or a reduced amount of unicast load.

56. The apparatus of claim 51, further comprising:
means for scheduling to send broadcast/multicast data based on the network resource allocation at a first bit rate, the first bit rate greater than GBR; and
means for receiving from the network coordination entity an adjusted network resource allocation to a second bit rate based on the occurrence of an event, the second bit rate equal to GBR.

57. The apparatus of claim 56, wherein the event occurs upon the apparatus transmitting to the network coordination entity information indicating an unavailability of network resources to meet the first bit rate.

58. The apparatus of claim 56, wherein the event occurs when the network coordination entity determines to allow a new session to be scheduled.

59. The apparatus of claim 56, further comprising means for receiving instructions from the network coordination entity to drop data packets according to a predetermined packet dropping rule when the available network resources cannot meet the second bit rate.

60. The apparatus of claim 59, further comprising:
means for receiving from the network coordination entity another adjusted network resource allocation to a third bit rate based on the occurrence of another event, the third bit rate no greater than MBR; and
means for receiving instructions from the network coordination entity to stop dropping data packets upon the occurrence of the another event.

61. The apparatus of claim 60, wherein the another event occurs when the apparatus transmits to the network coordination entity information indicating an availability of network resources to meet the third bit rate.

62. An apparatus of wireless communication, comprising:
means for transmitting at least one bit rate for allocating network resources of a session to at least one network coordination entity, wherein the at least one bit rate comprises a maximum bit rate (MBR) and a guaranteed bit rate (GBR), the MBR different than the GBR;
means for receiving an adjusted bit rate from the network coordination entity, wherein the adjusted bit rate is based on at least one of a change in an amount of data being received by at least one base station via the allocated network resources or a change in a unicast load; and
means for transmitting data based on the adjusted bit rate.

63. The apparatus of claim 62, wherein the at least one bit rate can be adjusted after a start of the session, the session being a broadcast/multicast session.

64. The apparatus of claim 62, wherein the network coordination entity determines the adjusted network resource allocation based on an amount of available resources for transmitting data to at least one base station.

65. The apparatus of claim 61, wherein the network coordination entity determines the amount of available resources based on status information received from the at least one base station indicating one or more of a change in an amount of data being received by the at least one base station via the allocated network resources or a change in a unicast load.

66. The apparatus of claim 64, wherein the adjusted network resource allocation allocates more network resources to a higher priority session based on MBR if the amount of available network resources exceeds a threshold.

67. The apparatus of claim 64, wherein the adjusted network resource allocation allocates less network resources to a lower priority session based on GBR if the amount of available network resources is less than a threshold.

68. The apparatus of claim 62, further comprising:
means for determining a consolidated adjusted bit rate based on a plurality of adjusted bit rates received from a plurality of network coordination entities;
means for sending a rate adjustment request to a content source based on the consolidated adjusted bit rate; and
means for receiving content from the content source according to the consolidated adjusted bit rate,
wherein the data transmitted based on the adjusted bit rate is based on the content received from the content source according to the consolidated adjusted bit rate.

69. An apparatus for wireless communication, uprising:
a memory; and
at least one processor coupled to the memory and configured to:
receive at least one bit rate for allocating network resources from a network service center;
allocate the network resources based on the at least one bit rate;
inform all base stations in a broadcast/multicast area of the network resource allocation;
receive from at least one base station in the broadcast/multicast area status information indicating one or more a change in an amount of data being received by the at least one base station via the allocated network resources or a change in a unicast load; and
adjust the network resource allocation based on the received status information,
wherein the at least one bit rate comprises a maximum bit rate (MBR) and a guaranteed bit rate (GBR), the at least one processor further configured to:
determine an amount of available network resources for adjusting a network resource allocation of a session;
determine an adjusted bit rate for transmitting data based on the adjusted network resource allocation; and
inform the network service center and all base stations of the adjusted bit rate.

70. The apparatus of claim 69, wherein the at least one bit rate can be updated after a start of a broadcast/multicast session.

71. The apparatus of claim 69, wherein the MBR is equal to the GBR.

72. The apparatus of claim 71, wherein the network resources are used for unicast mode when the network resources are not used for a broadcast/multicast mode.

73. The apparatus of claim 69, wherein the at least one processor is configured to adjust the network resource allocation by reducing an amount of the allocated network resources based on the GBR when the status information indicates one or more of a reduced amount of data being received by the at least one base station or an increased amount of unicast load.

74. The apparatus of claim 69, wherein the at least one processor is configured to adjust the network resource allocation by increasing an amount of the allocated network resources based on the MBR when the status information indicates one or more of an increased amount of data being received by the at least one base station or a reduced amount of unicast load.

75. The apparatus of claim 69, wherein the at least one processor is further configured to:
allocate the network resources for a session based on a first bit rate, the first bit rate greater than GBR; and
adjust the network resource allocation to a second bit rate based on the occurrence of an event, the second bit rate equal to GBR.

76. The apparatus of claim 75, wherein the event occurs upon the processing system receiving from at least one base station in the broadcast/multicast area information indicating an unavailability of network resources to meet the first bit rate.

77. The apparatus of claim 75, wherein the event occurs upon the processing system determining to allow a new session to be scheduled.

78. The apparatus of claim 75, wherein the at least one processor is further configured to instruct at least one base station to drop data packets according to a predetermined packet dropping rule when the available network resources cannot meet the second bit rate.

79. The apparatus of claim 78, wherein the at least one processor is further configured to:
adjust the network resource allocation to a third bit rate based on the occurrence of another event, the third bit rate no greater than MBR; and
instruct the at least one base station to stop dropping data packets upon the occurrence of the another event.

80. The apparatus of claim 79, wherein the another event occurs upon the processing system receiving from all base stations in the broadcast/multicast area information indicating an availability of network resources to meet the third bit rate.

81. The apparatus of claim 69, wherein the at least one processor is configured to determine the amount of available resources by receiving from at least one base station in the broadcast/multicast area status information indicating one or more of a change in an amount of data being received by the at least one base station via the allocated network resources of a change in a unicast load.

82. The apparatus of claim 69, wherein the at least one processor is configured to adjust the network resource allocation of the session by allocating more network resources to a higher priority session based on MBR if an amount of available network resources exceeds a threshold.

83. The apparatus of claim 69, wherein the at least one processor is configured to adjust the network resource allocation of the session by allocating less network resources to a lower priority session based on GBR if an amount of available network resources are below a threshold.

84. The apparatus of claim 69, wherein a message type for informing the network service center of the adjusted bit rate is dependent on a transport protocol between the network service center and a content source.

85. An apparatus for wireless communication, comprising:
a memory; and
at least one processor coupled to the memory and configured to:
receive a network resource allocation from a network coordination entity, the network resource allocation based on at least one bit rate received from a network service center, wherein the at least one bit rate is higher than a guaranteed bit rate (GBR) and lower than a maximum bit rate (MBR);
schedule to send received broadcast/multicast data based on the network resource allocation;
determine a change in an amount of data being received via the network resource allocation and/or a change in a unicast load;

transmit to the network coordination entity status information indicating one or more of the change in the amount of data being received or the change in the unicast load; and
receive from the network coordination entity an adjusted network resource allocation based on the transmitted status information.

86. The apparatus of claim 85, wherein the at least one bit rate can be updated after a start of a broadcast/multicast session.

87. The apparatus of claim 85, the processing system further configured to use the network resource allocation to send unicast data when all of the network resource allocation is not used to send the received broadcast/multicast data.

88. The apparatus of claim 85, wherein the adjusted network resource allocation comprises a reduced amount of allocated network resources based on the GBR when the status information indicates one or more of a reduced amount of data being received or an increased amount of unicast load.

89. The apparatus of claim 85, wherein the adjusted network resource allocation comprises an increased amount of allocated network resources based on the MBR when the status information indicates one or more of an increased amount of data being received or a reduced amount of unicast load.

90. The apparatus of claim 85, wherein the at least one processor is further configured to:
schedule to send broadcast/multicast data based on the network resource allocation at a first bit rate, the first bit rate greater than GBR; and
receive from the network coordination entity an adjusted network resource allocation to a second bit rate based on the occurrence of an event, the second bit rate equal to GBR.

91. The apparatus of claim 90, wherein the event occurs upon the processing system transmitting to the network coordination entity information indicating an unavailability of network resources to meet the first bit rate.

92. The apparatus of claim 90, wherein the event occurs when the network coordination entity determines to allow a new session to be scheduled.

93. The apparatus of claim 90, wherein the at least one processor is further configured to receive instructions from the network coordination entity to drop data packets according to a predetermined packet dropping rule when the available network resources cannot meet the second bit rate.

94. The apparatus of claim 93, wherein at least one processor is further configured to:
receive from the network coordination entity another adjusted network resource allocation to a third bit rate based on the occurrence of another event, the third bit rate no greater than MBR; and
receive instructions from the network coordination entity to stop dropping data packets upon the occurrence of the another event.

95. The apparatus of claim 94, wherein the another event occurs upon the processing system transmitting to the network coordination entity information indicating an availability of network resources to meet the third bit rate.

96. An apparatus for wireless communication, comprising:
a memory; and
at least one processor coupled to the memory and configured to:
transmit at least one bit rate for allocating network resources of a session to a network coordination entity, wherein the at least one bit rate is higher than a guaranteed bit rate (GBR) and lower than a maximum bit rate (MBR);
receive an adjusted bit rate from the network coordination entity, wherein the adjusted bit rate is based on one or more of a change in an amount of data being received by at least one base station via the allocated network resources or a change in a unicast load; and
transmit data based on the adjusted bit rate.

97. The apparatus of claim 96, wherein the at least one bit rate can be adjusted after a start of the session, the session being a broadcast/multicast session.

98. The apparatus of claim 96, wherein the network coordination entity determines the adjusted network resource allocation based on an amount of available resources for transmitting data to at least one base station.

99. The apparatus of claim 98, wherein the network coordination entity determines the amount of available resources based on status information received from the at least one base station indicating one or more of a change in an amount of data being received by the at least one base station via the allocated network resources or a change in a unicast load.

100. The apparatus of claim 98, wherein the adjusted network resource allocation allocates more network resources to a higher priority session based on MBR if the amount of available network resources exceeds a threshold.

101. The apparatus of claim 98, wherein the adjusted network resource allocation allocates less network resources to a lower priority session based on GBR if the amount of available network resources is less than a threshold.

102. The apparatus of claim 96, wherein the at least one processor is further configured to:
determine a consolidated adjusted bit rate based on a plurality of adjusted bit rates received from a plurality of network coordination entities;
send a rate adjustment request to a content source based on the consolidated adjusted bit rate; and
receive content from the content source according to the consolidated adjusted bit rate,
wherein the data transmitted based on the adjusted bit rate is based on the content received from the content source according to the consolidated adjusted bit rate.

103. A computer-readable medium storing computer executable code for wireless communication, comprising code to:
receive at least one bit rate for allocating network resources from a network service center;
allocate the network resources based on the at least one bit rate;
inform all base stations in a broadcast/multicast area of the network resource allocation;
receive from at least one base station in the broadcast/multicast area status information indicating one or more of a change in an amount of data being received by the at least one base station via the allocated network resources or a change in a unicast load; and
adjust the network resource allocation based on the received status information,
wherein the at least one bit rate comprises a maximum bit rate (MBR) and a guaranteed bit rate (GBR), the computer-readable medium further comprising code to:
determine an amount of available network resources for adjusting a network resource allocation of a session;
determine an adjusted bit rate for transmitting data based on the adjusted network resource allocation; and inform the network service center and all base stations of the adjusted bit rate.

104. The computer-readable medium of claim 103, wherein at least one bit rate can be updated after a start of a broadcast/multicast session.

105. The computer-readable medium of claim 103, further comprising code to:
allocate the network resources for a session based on a first bit rate, the first bit rate greater than GRB; and
adjust the network resource allocation to a second bit rate based on the occurrence of an event, the second bit rate equal to GBR.

106. A computer-readable medium storing computer executable code for wireless communication, comprising code to:
receive a network resource allocation from a network coordination entity, the network resource allocation based on at least one bit rate received from network service center, wherein the at least one bit rate is higher than guaranteed bit rate (GBR) and lower than a maximum bit rate (MBR);
schedule to send received broadcast/multicast data based on the network resource allocation;
determine one or more of a change in an amount of data being received via the network resource allocation or a change in a unicast load;
transmit to the network coordination entity status information indicating one or more of the change in the amount of data being received or the change in the unicast load; and
receive from the network coordination entity an adjusted network resource allocation based on the transmitted status information.

107. The computer-readable medium of claim 106, wherein the at least one bit rate can be updated after a start of a broadcast/multicast session.

108. The computer-readable medium of claim 106, further comprising code to:
schedule to send broadcast/multicast data based on the network resource allocation at a first bit rate, the first bit rate greater than GBR; and
receive from the network coordination entity an adjusted network resource allocation to a second bit rate based on the occurrence of an event, the second bit rate equal to GBR.

109. A computer-readable medium storing computer executable code for wireless communication, comprising code to:
transmit at least one bit rate for allocating network resources of a session to at least one network coordination entity, wherein the at least one bit rate is higher than a guaranteed bit rate (GBR) and lower than a maximum bit rate (MBR);
receive an adjusted bit rate from the at least one network coordination entity wherein the adjusted bit rate is based on one or more of a change in an amount of data being received by at least one base station via the allocated network resources or a change in a unicast load; and
transmit data based on the adjusted bit rate.

110. The computer-readable medium of claim 109, wherein the at least one bit rate can be adjusted after a start of the session, the session being a broadcast/multicast session.

111. The computer-readable medium of claim 109, further comprising code to:
determine a consolidated adjusted bit rate based on a plurality of adjusted bit rates received from a plurality of network coordination entities;
send a rate adjustment request to a content source based on the consolidated adjusted hit rate; and
receive content from the content source according to the consolidated adjusted bit rate,
wherein the data transmitted based on the adjusted bit rate is based on the content received from the content source according to the consolidated adjusted bit rate.

* * * * *